US012574863B2

(12) United States Patent
Jin et al.

(10) Patent No.: US 12,574,863 B2
(45) Date of Patent: Mar. 10, 2026

(54) METHOD AND APPARATUS FOR SUPPORTING POWER HEADROOM REPORT FOR PUSCH RETRANSMISSION USING MULTIPLE TRANSMISSION RECEPTION POINTS IN NEW GENERATION WIRELESS COMMUNICATION SYSTEM

(71) Applicant: SAMSUNG ELECTRONICS CO., LTD., Suwon-si (KR)

(72) Inventors: Seungri Jin, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 18/305,145

(22) Filed: Apr. 21, 2023

(65) Prior Publication Data

US 2023/0345384 A1      Oct. 26, 2023

(30) Foreign Application Priority Data

Apr. 21, 2022      (KR) ........................ 10-2022-0049699

(51) Int. Cl.
*H04W 52/36* (2009.01)
*H04W 52/14* (2009.01)
*H04W 52/32* (2009.01)

(52) U.S. Cl.
CPC ....... *H04W 52/365* (2013.01); *H04W 52/146* (2013.01); *H04W 52/325* (2013.01)

(58) Field of Classification Search
CPC ............. H04W 52/365; H04W 52/146; H04W 52/325; H04W 52/40; H04W 72/21;
(Continued)

(56) References Cited

U.S. PATENT DOCUMENTS 10,841,917 B2      11/2020   Kim et al.
2015/0139202 A1      5/2015   Dinan
(Continued)

FOREIGN PATENT DOCUMENTS

KR      10-2023-0018045 A      2/2023

OTHER PUBLICATIONS

International Search Report and Written Opinion of the International Searching Authority dated Jul. 27, 2023, in connection with International Application No. PCT/KR2023/005445, 9 pages.
(Continued)

*Primary Examiner* — Frantz Bataille

(57) ABSTRACT

The disclosure relates to a 5G or 6G communication system for supporting a higher data transmission rate. The method of UE comprises: receiving RRC message comprising cell group configuration information for configuring a first cell group and a second cell group; determining whether a PHR triggering condition is satisfied; determining whether multiple TRPs-based PUSCH repetition related to a serving cell is configured for an arbitrary activated serving cell included in the first cell group and the second cell group, and whether a serving cell group to which the activated serving cell belongs is configured to enable the PHR for the multiple TRPs; obtaining two pieces of power headroom related to the arbitrary activated serving cell; and transmitting a PHR MAC CE comprising the two pieces of power headroom related to the arbitrary activated serving cell to the base station.

20 Claims, 19 Drawing Sheets

(58) Field of Classification Search
CPC ... H04W 8/24; H04W 72/1268; H04W 72/23;
H04W 76/15; H04L 1/08; H04L 5/001
See application file for complete search history.

(56) References Cited

U.S. PATENT DOCUMENTS

| | | | |
|---|---|---|---|
| 2016/0301513 A1 | 10/2016 | He et al. | |
| 2016/0309423 A1* | 10/2016 | Lee | H04B 7/26 |
| 2017/0325181 A1 | 11/2017 | Hwang et al. | |
| 2020/0053666 A1* | 2/2020 | Park | H04W 52/346 |
| 2023/0042752 A1 | 2/2023 | Jin et al. | |

OTHER PUBLICATIONS

3GPP TS 36.331 V17.0.0 (Mar. 2022); 3rd Generation Partnership Project; Technical Specification Group Radio Access Network; Evolved Universal Terrestrial Radio Access (E-UTRA); Radio Resource Control (RRC); Protocol specification (Release 17), Mar. 2022, 1119 pages.
Supplementary European Search Report dated May 22, 2025, in connection with European Patent Application No. 23792234.9, 8 pages.
3GPP TS 38.321 V17.0.0 (Mar. 2022) Technical Specification; 3rd Generation Partnership Project; Technical Specification Group Radio Access Network; NR; Medium Access Control (MAC) protocol specification (Release 17); 221 pages.
3GPP TS 38.331 V17.0.0 (Mar. 2022) Technical Specification; 3rd Generation Partnership Project; Technical Specification Group Radio Access Network; NR; Radio Resource Control (RRC) protocol specification (Release 17); 1221 pages.
3GPP TS 38.423 V16.4.0 (Jan. 2021) Technical Specification; 3rd Generation Partnership Project; Technical Specification Group Radio Access Network; NG-RAN; Xn application protocol (XnAP) (Release 16); 457 pages.

* cited by examiner

FIG. 1FB
Single Entry PHR MAC CE format (1f-21)
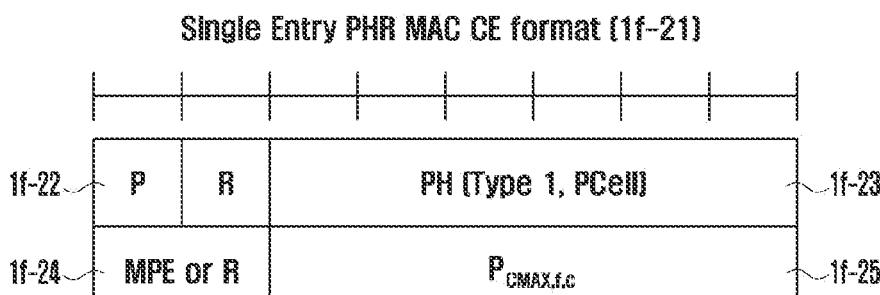
Multiple Entry PHR MAC CE format (1f-31)
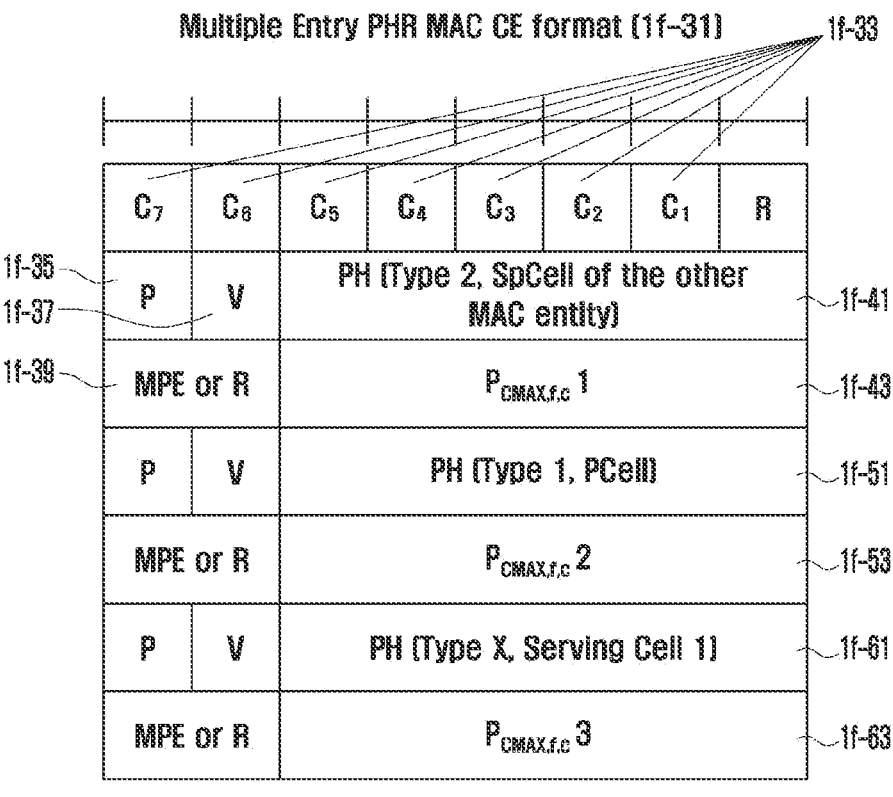

FIG. 1G
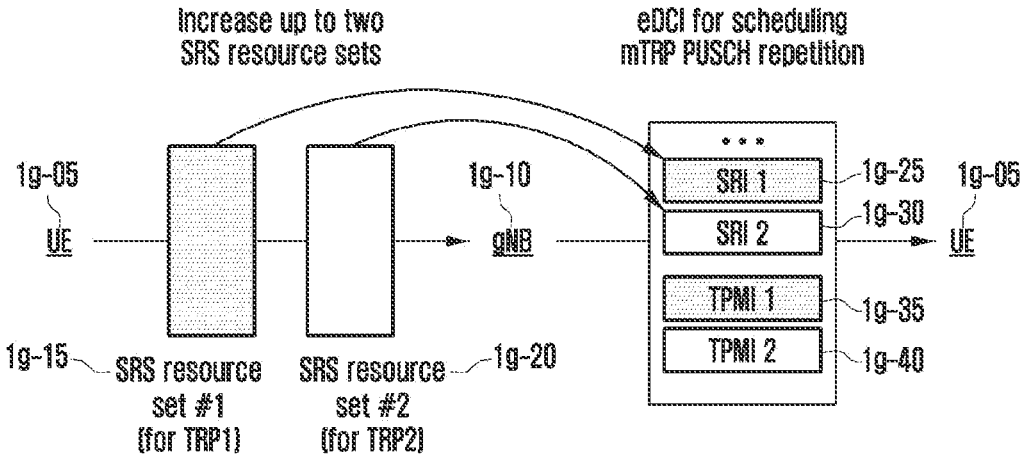
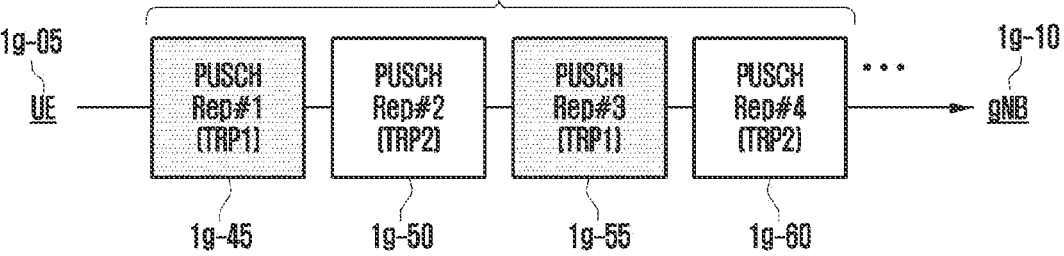
PUSCH repetition for TRP1 is associated to the first SRI field
PUSCH repetition for TRP2 is associated to the second SRI field Enhanced Multiple Entry PHR MAC CE format Option 1 (1I-05)

Enhanced Multiple Entry PHR MAC CE format Option 2 (1I-105)

Enhanced Multiple Entry PHR MAC CE format Option 3 (11-205)

Enhanced Multiple Entry PHR MAC CE format Option 1 (1J-05)

Enhanced Multiple Entry PHR MAC CE format Option 2 (1j-105)

Enhanced Multiple Entry PHR MAC CE format Option 3 (1J-205)

gNB

RRC connection configuration ~1I-05

Request and receive UE capability ~1I-10

Provide PHR configuration through RRC message
(mTRP PHR and PUSCH repetition configuration) ~1I-15

Indicate sTRP/mTRP PUSCH repetition through DCI ~1I-20

Receive PHR (receive PHR for each cell group) ~1I-25

Control power according to received PHR ~1I-30

METHOD AND APPARATUS FOR SUPPORTING POWER HEADROOM REPORT FOR PUSCH RETRANSMISSION USING MULTIPLE TRANSMISSION RECEPTION POINTS IN NEW GENERATION WIRELESS COMMUNICATION SYSTEM

CROSS-REFERENCE TO RELATED APPLICATION

This application is based on and claims priority under 35 U.S.C. § 119 to Korean Patent Application No. 10-2022-0049699, filed on Apr. 21, 2022, in the Korean Intellectual Property Office, the disclosure of which is herein incorporated by reference in its entirety.

BACKGROUND

1. Field

The disclosure relates to an operation of a user equipment and a base station for scheduling in consideration of transmission power of the UE for each transmission reception point (TRP) in a wireless communication system.

More specifically, the disclosure relates to an operation of a UE and a base station for scheduling according to transmission power of the UE for each transmission reception point by transferring power headroom for multiple TRPs with respect to cells in which a physical shared uplink channel (PUSCH) repetition is activated, in case that the multiple TRPs are configured.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G.

In the initial state of 5G mobile communication technologies, in order to support services and to satisfy performance requirements in connection with enhanced Mobile Broad-Band, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the advance of wireless communication systems as described above, various services can be provided, and accordingly there is a need for schemes to effectively provide these services.

The above information is presented as background information only to assist with an understanding of the disclosure. No determination has been made, and no assertion is made, as to whether any of the above might be applicable as prior art with regard to the disclosure.

SUMMARY

The disclosure is to suggest a method of a UE for performing a power headroom report (PHR) with respect to multiple transmission reception points (TRPs) to a base station in a wireless communication system in case that the multiple TRPs exist.

Specifically, the disclosure is to suggest a method for performing PHR in consideration of a situation in which multiple TRPs and one TRP are mixed (carrier aggregation (CA) and dual connectivity (DC)).

To solve the above problems, the disclosure provides a method performed by a UE in a wireless communication system, the method including an operation of receiving an RRC message including cell group configuration information for configuring a first cell group and a second cell group from a base station, wherein the cell group configuration information includes information on whether each of the first cell group and the second cell group may perform a power headroom report (PHR) with respect to multiple transmission reception points (TRPs), an operation of identifying whether a PHR triggering condition is satisfied, an operation of identifying whether a PHR-triggered cell group is configured to perform a PHR with respect to multiple TRPs based on the cell group configuration information in case that the PHR triggering condition is satisfied, an operation of identifying, in case that the PHR-triggered cell group is configured to perform a PHR with respect to multiple TRPs, whether multiple TRPs-based physical uplink shared channel (PUSCH) repetition related to a serving cell is configured with respect to the arbitrary activated serving cell included in the first cell group and the second cell group and whether a serving cell group to which the activated serving cell belongs is configured to enable a power headroom report for multiple TRPs, an operation of obtaining two power headrooms related to the arbitrary activated serving cell in case that multiple TRPs-based PUSCH repetition related to the serving cell is configured with respect to the arbitrary activated serving cell and the cell group to which the arbitrary activated serving cell belongs is configured to perform a power headroom report with respect to multiple TRPs, and an operation of transmitting a PHR medium access control (MAC) control element (CE) including the two power headroom related to the arbitrary activated serving cell to the base station.

To solve the above problems, the disclosure provides a method performed by a first base station in a wireless communication system, the method including an operation of transmitting an RRC message including cell group configuration information for configuring a first cell group and a second cell group to a user equipment (UE), wherein the cell group configuration information includes information on whether each of the first cell group and the second cell group may perform a power headroom report (PHR) with respect to multiple transmission reception points (TRPs), and an operation of receiving a PHR medium access control (MAC) control element (CE) including two power headrooms related to the arbitrary activated serving cell in case that multiple TRPs-based physical uplink shared channel (PUSCH) repetition related to a serving cell is configured with respect to the arbitrary activated serving cell included in the first cell group and the second cell group and a serving cell group to which the activated serving cell belongs is configured to enable a power headroom report for multiple TRPs, and wherein whether a PHR-triggered cell group is configured to perform a PHR with respect to multiple TRPs is determined based on the cell group configuration information.

To solve the above problems, the disclosure provides a UE in a wireless communication system, the UE including a transceiver for transmitting/receiving a signal and a controller, wherein the controller receives an RRC message including cell group configuration information for configuring a first cell group and a second cell group from a base station, the cell group configuration information including information on whether each of the first cell group and the second cell group may perform a power headroom report (PHR) with respect to multiple transmission reception points (TRPs), identifies whether a PHR triggering condition is satisfied, identified whether a PHR-triggered cell group is configured to perform a PHR with respect to multiple TRPs based on the cell group configuration information in case that the PHR triggering condition is satisfied, identifies, in case that the PHR-triggered cell group is configured to perform a PHR with respect to multiple TRPs, whether multiple TRPs-based physical uplink shared channel (PUSCH) repetition related to a serving cell is configured with respect to the arbitrary activated serving cell included in the first cell group and the second cell group and whether a serving cell group to which the activated serving cell belongs is configured to enable a power headroom report for multiple TRPs, obtains two power headrooms related to the arbitrary activated serving cell in case that multiple TRPs-based PUSCH repetition related to the serving cell is configured with respect to the arbitrary activated serving cell and the cell group to which the arbitrary activated serving cell belongs is configured to perform a power headroom report with respect to multiple TRPs, and transmits a PHR medium access control (MAC) control element (CE) including the two power headrooms related to the arbitrary activated serving cell to the base station.

To solve the above problems, the disclosure provides a first base station in a wireless communication system, the first base station including a transceiver for transmitting/receiving a signal and a controller, wherein the controller transmits an RRC message including cell group configuration information for configuring a first cell group and a second cell group to a user equipment (UE), the cell group configuration information including information on whether each of the first cell group and the second cell group may perform a power headroom report (PHR) with respect to multiple transmission reception points (TRPs), and receives a PHR medium access control (MAC) control element (CE) including two power headrooms related to the arbitrary activated serving cell in case that multiple TRPs-based physical uplink shared channel (PUSCH) repetition related to a serving cell is configured with respect to the arbitrary activated serving cell included in the first cell group and the second cell group and a serving cell group to which the activated serving cell belongs is configured to enable a power headroom report for multiple TRPs, and wherein whether a PHR-triggered cell group is configured to perform a PHR with respect to multiple TRPs is determined based on the cell group configuration information.

According to an embodiment of the disclosure, a power headroom report (PHR) may be performed with respect to multiple transmission reception points (TRPs).

More specifically, a UE may perform a power headroom report with respect to multiple TRPs especially for cells in which a physical uplink shared channel (PUSCH) repetition function is activated, in a situation in which multiple TRPs are configured for carrier aggregation (CA) and dual connectivity (DC).

Through this, the disclosure provides an effect that a base station may perform scheduling according to transmission power of the UE for each TRP Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1FB illustrates an uplink transmission method in accordance with configuration and uplink types according to an embodiment of the disclosure;

FIG. 1G illustrates a case of supporting PUSCH repetition using multiple TRPs according to an embodiment of the disclosure;

FIG. 1IB illustrates a structure and characteristic of a MAC CE with respect to multiple TRPs in case that a PHR for a cell group to which serving cells belong is performed according to an embodiment of the disclosure;

FIG. 1IC illustrates a structure and characteristic of a MAC CE with respect to multiple TRPs in case that a PHR for a cell group to which serving cells belong is performed according to an embodiment of the disclosure;

FIG. 1JB illustrates a structure and characteristic of a MAC CE with respect to multiple TRPs in case that PHRs for serving cells belonging to all cell groups are concurrently performed in a DC situation according to an embodiment of the disclosure;

FIG. 1JC illustrates a structure and characteristic of a MAC CE with respect to multiple TRPs in case that PHRs for serving cells belonging to all cell groups are concurrently performed in a DC situation according to an embodiment of the disclosure;

FIG. 1M illustrates an internal structure of a UE to which an embodiment of the disclosure; and FIG. 1N illustrates a structure of a NR base station according to an embodiment of the disclosure.

DETAILED DESCRIPTION

Figure 1A:
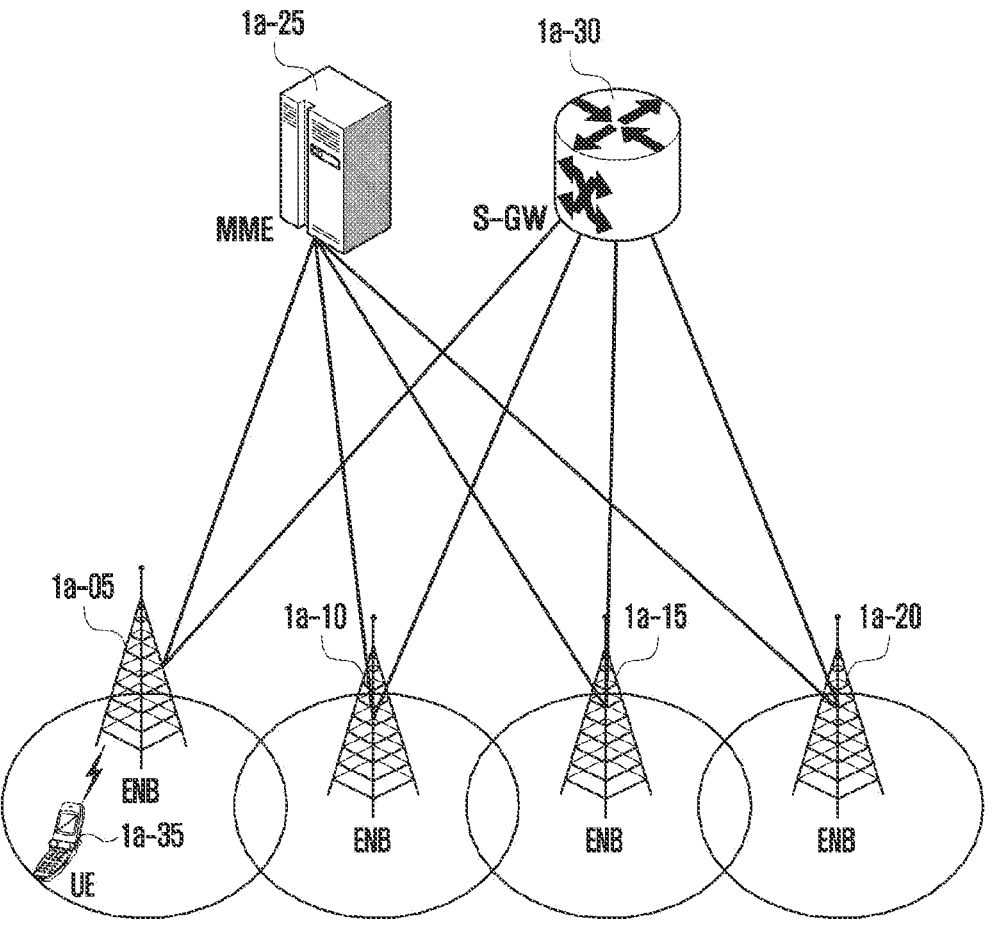
FIG. 1A illustrates a structure of a long term evolution (LTE) system according to an embodiment of the disclosure.

Hereinafter, embodiments of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

FIG. 1A illustrates a structure of a long-term evolution (LTE) system according to an embodiment of the disclosure.

Referring to FIG. 1A, a radio access network of the LTE system may include next-generation base stations (evolved Node Bs, hereinafter, referred to as "eNBs," "Node Bs," or "base stations") 1a-05, 1a-10, 1a-15, and 1a-20, a mobility management entity (MME) 1a-25, and a serving-gateway (S-GW) 1a-30. A user equipment (hereinafter, referred to as a "UE" or a "terminal") 1a-35 may access an external network through the eNBs 1a-05 to 1a-20 and the S-GW 1a-30.

In FIG. 1A, the eNBs 1a-05 to 1a-20 may correspond to the legacy Node Bs of a UMTS system. The eNB may be connected to the UE 1a-35 via a radio channel, and may perform more complex functions than the legacy Node B. In the LTE system, all user traffics including real-time services, such as voice over Internet protocol (VoIP) may be serviced through a shared channel and thus a device for collecting state information, such as buffer state information, available transmission power state information, and channel state information of UEs, and performing scheduling may be required, and each of the eNBs 1a-05 to 1a-20 may correspond to the device. A single eNB may generally control multiple cells. For example, the LTE system uses a radio-access technology, such as orthogonal frequency-division multiplexing (OFDM) in a bandwidth of 20 MHz to realize a transmission rate of 100 Mbps. In addition, an adaptive modulation & coding (AMC) scheme for determining a modulation scheme and a channel-coding rate is applied in accordance with the channel state of a UE. The S-GW 1a-30 is a device for providing a data bearer, and may generate or remove the data bearer under the control of the MME 1a-25. The MME is a device in charge of various control functions as well as a mobility management function for the UE, and is connected to multiple base stations.

Figure 1B:
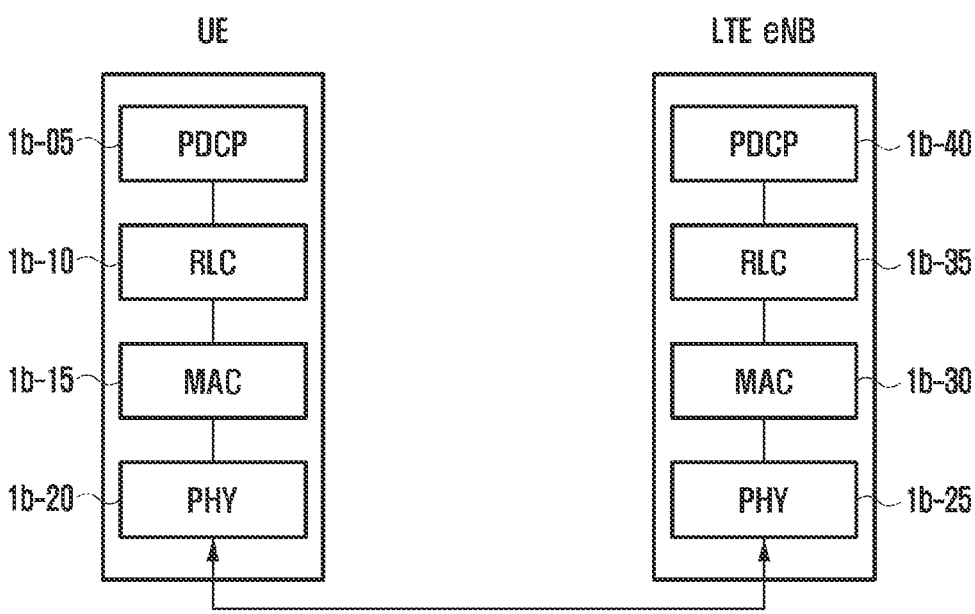
FIG. 1B illustrates a radio protocol structure in an LTE system according to an embodiment of the disclosure.

FIG. 1B illustrates a radio protocol structure in an LTE system according to an embodiment of the disclosure.

Referring to FIG. 1B, the wireless protocol of the LTE system includes packet data convergence protocols (PDCP) 1b-05 and 1b-40, radio link controls (RLC) 1b-10 and 1b-35, and medium access controls (MAC) 1b-15 and 1b-30.

The PDCPs 1b-05 and 1b-40 are in charge of operations such as IP header compression/restoration. The main functions of PDCP are summarized below:

Header compression and decompression: ROHC only;
Transfer of user data;
In-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and
Timer-based SDU discard in uplink.

The radio link controls (RLCs) 1b-10 and 1b-35 may reconfigure the PDCP protocol data unit (PDU) at an appropriate size to perform an ARQ operation or the like. The main functions of the RLC are summarized below:

Transfer of upper layer PDUs;
Error correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);

RLC SDU discard (only for UM and AM data transfer); and

RLC re-establishment.

The MACs 1b-15 and 1b-30 are connected to multiple RLC layer devices configured in one UE, and may perform an operation of multiplexing RLC PDUs into a MAC PDU and demultiplexing the RLC PDUs from the MAC PDU. The main functions of the MAC are summarized below:

Mapping between logical channels and transport channels;

Multiplexing/demultiplexing of MAC SDUs belonging to one or different logical channels into/from transport blocks (TB) delivered to/from the physical layer on transport channels;

Scheduling information reporting;

Error correction through HARQ;

Priority handling between logical channels of one UE;

Priority handling between UEs by means of dynamic scheduling;

MBMS service identification;

Transport format selection; and

Padding.

The physical layers 1b-20 and 1b-25 channel-code and modulate upper layer data, convert into OFDM symbols to be transmitted over a wireless channel, or demodulate and channel-decode OFDM symbols received through the wireless channel to be transmitted to an upper layer. Furthermore, the physical layers also use hybrid ARQ (HARQ) for additional correction of errors and a reception end transmits whether the packet transmitted from a transmission end has been received by using 1 bit. This is called HARQ ACK/NACK information. The downlink HARQ ACK/NACK information on the uplink transmission may be transmitted on a physical hybrid-ARQ indicator channel (PHICH) physical channel, and the uplink HARQ ACK/NACK information on the downlink transmission may be transmitted on a physical uplink control channel (PUCCH) or physical uplink shared channel (PUSCH) physical channel.

The PHY layer may include one or more of frequencies/carriers and a technology for simultaneously configuring and using multiple frequencies is called carrier aggregation (CA). According to the CA technology, instead of using only one carrier for communication between a UE (or terminal) and a base station (or E-UTRAN NodeB, eNB), one or more secondary carriers are additionally used together with one primary carrier and thus data capacity may be greatly increased by the number of secondary carriers. In LTE, a cell served by a base station using the primary carrier is called a primary cell (PCell) and a cell using the secondary carrier is called a secondary cell (SCell).

Although not shown in the drawing, radio resource control (RRC) layers are present above the PDCP layers of the UE and the base station and the RRC layers may exchange configuration control information related to access and measurement to control wireless resources.

Figure 1C:
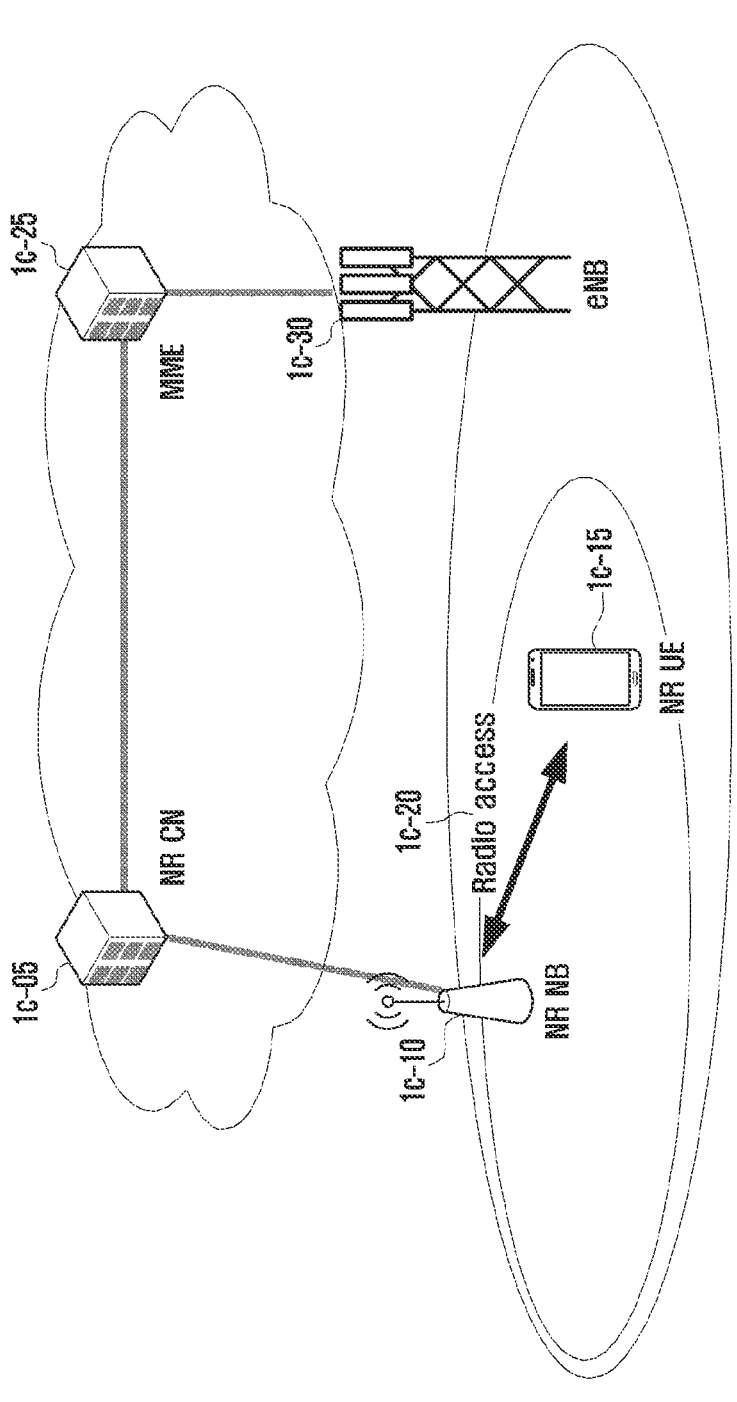
FIG. 1C illustrates a structure of a next-generation mobile communication system according to an embodiment of the disclosure.

FIG. 1C illustrates a structure of a next-generation mobile communication system according to an embodiment of the disclosure.

Referring to FIG. 1C, a radio access network of the next-generation mobile communication system (e.g., a new radio (NR) or 5G system) may include a new radio node B (NR NB) 1c-10 and a new radio core network (NR CN) (or next-generation core network (NG CN)) 1c-05. A new radio user equipment (NR UE) (or UE) 1c-15 accesses an external network via the NR NB 1c-10 and the NR CN 1c-05.

In FIG. 1C, the NR NB 1c-10 corresponds to an evolved node B (eNB) of a legacy LTE system. The NR NB is connected to the NR UE 1c-15 through radio channels and may provide superior services compared to a legacy node B. In the next-generation mobile communication, all user traffics including real-time services may be serviced through a shared channel and thus a device for collecting state information, such as buffer state information, available transmission power state information, and channel state information of UEs, and performing scheduling may be required, and the NR NB 1c-10 may correspond to the device. A single NR NB may generally control multiple cells. A bandwidth greater than the legacy maximum bandwidth may be given to achieve an ultrahigh data rate compared to the legacy LTE, and beamforming technology may be added to radio access technology such as orthogonal frequency-division multiplexing (OFDM). In addition, an adaptive modulation & coding (AMC) scheme for determining a modulation scheme and a channel-coding rate is applied in accordance with the channel state of a UE. The NR CN 1c-05 performs functions such as mobility support, bearer setup, and QoS setup. The NR CN is a device in charge of various control functions as well as a mobility management function for the UE, and is connected to multiple base stations. The next-generation mobile communication system may be linked with the legacy LTE system, and the NR CN 1c-05 is connected to an MME 1c-25 through a network interface. The MME 1c-25 is connected to an eNB 1c-30 corresponding to a legacy base station.

Figure 1D:
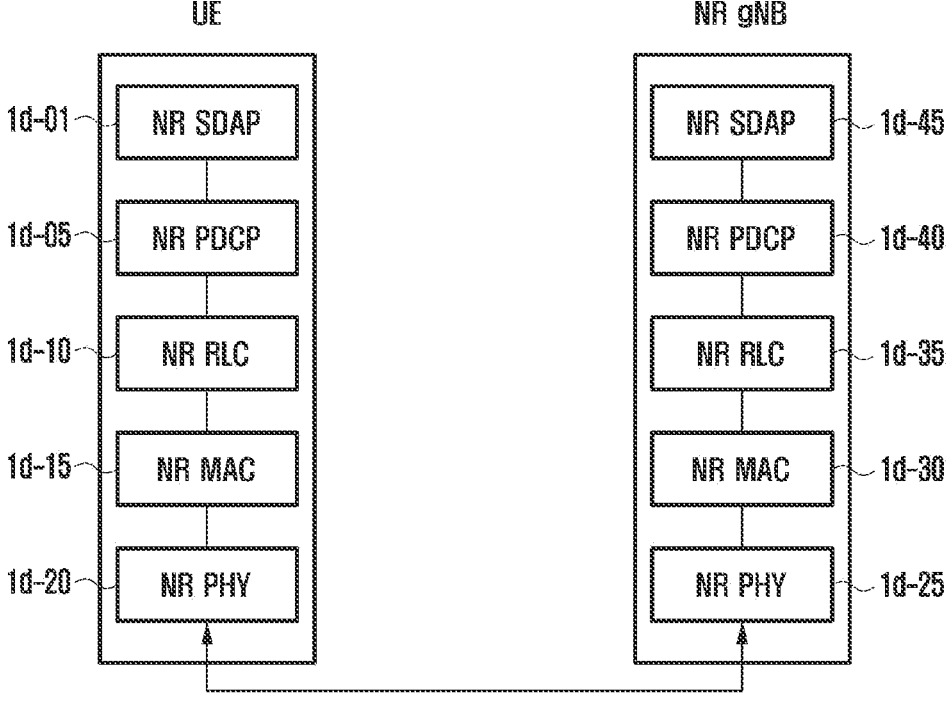
FIG. 1D illustrates a radio protocol structure of a next-generation mobile communication system according to an embodiment of the disclosure.

FIG. 1D illustrates a radio protocol structure of a next-generation mobile communication system according to an embodiment of the disclosure.

Referring to FIG. 1D, the radio protocol of the next-generation mobile communication system includes an NR SDAP 1d-01 or 1d-45, an NR PDCP 1d-05 or 1d-40, an NR RLC 1d-10 or 1d-35, and an NR MAC 1d-15 or 1d-30 for a UE and a NR gNB.

Main functions of the NR SDAP 1d-01 or 1d-45 may include some of the following functions:

Transfer of user data;

Mapping between a QoS flow and a DRB for both DL and UL;

Marking QoS flow ID in both DL and UL packets; and

Reflective QoS flow to DRB mapping for the UL SDAP PDUs.

For an SDAP layer device, the UE may receive, through an RRC message, a configuration as to whether to use a header of the SDAP layer device or to use a function of the SDAP layer device for each PDCP layer device, each bearer, or each logical channel. In case that an SDAP header is configured, the UE may be indicated to update or reconfigure, with an NAS reflective QoS 1-bit indicator and an AS reflective QoS 1-bit indicator of the SDAP header, mapping information for uplink and downlink QoS flows and a data bearer. The SDAP header may include QoS flow ID information indicating the QoS. The QoS information may be used for data-processing priority, scheduling information, or the like in order to ensure a smooth service.

Main functions of the NR PDCP 1d-05 or 1d-40 may include some of the following functions:

Header compression and decompression: ROHC only;

Transfer of user data;

In-sequence delivery of upper layer PDUs;

Out-of-sequence delivery of upper layer PDUs;

PDCP PDU reordering for reception;

Duplicate detection of lower layer SDUs;

Retransmission of PDCP SDUs;

Ciphering and deciphering; and

Timer-based SDU discard in uplink.

In the above description, the reordering function of the NR PDCP device refers to a function of sequentially rearranging PDCP PDUs received in a lower layer based on a PDCP sequence number (SN). The reordering function of the NR PDCP device may include a function of transferring data to an upper layer in the rearranged order and a function of directly transferring data without considering an order. The reordering function of the NR PDCP device may include a function of recording lost PDCP PDUs by rearranging an order, a function of reporting a state of the lost PDCP PDUs to a transmission end, and a function of requesting retransmission of the lost PDCP PDUs.

Main functions of the NR RLC 1*d*-10 or 1*d*-35 may include some of the following functions:

Transfer of upper layer PDUs;

In-sequence delivery of upper layer PDUs;

Out-of-sequence delivery of upper layer PDUs;

Error correction through ARQ;

Concatenation, segmentation and reassembly of RLC SDUs;

Re-segmentation of RLC data PDUs;

Reordering of RLC data PDUs;

Duplicate detection;

Protocol error detection;

RLC SDU discard; and

RLC re-establishment.

In the above description, the in-sequence delivery function of the NR RLC device refers to a function of sequentially transferring RLC SDUs received from a lower layer to an upper layer. The in-sequence delivery function of the NR RLC device may include a function of reassembling and transferring, when a single RLC SDU is divided into multiple RLC SDUs and received, the divided multiple RLC SDUs and a function of rearranging the received RLC PDUs based on an RLC sequence number (SN) or a PDCP sequence number (SN). The in-sequence delivery function of the NR RLC device may include a function of recording lost RLC PDUs by rearranging an order, a function of reporting the state of the lost RLC PDUs to a transmission end, and a function of requesting retransmission of the lost RLC PDUs. The in-sequence delivery function of the NR RLC device may include a function of sequentially transferring only RLC SDUs preceding the lost RLC SDU to the upper layer when there is a lost RLC SDU, a function of sequentially transferring all received RLC SDUs to the upper layer before a predetermined timer starts if the timer expires even when there is a lost RLC SDU, and a function of transferring all RLC SDUs received up to that point in time to the upper layer if the predetermined timer expires even when there is a lost RLC SDU.

Furthermore, the NR RLC may process the RLC PDUs in the received order, that is, in order of arrival regardless of the order of serial numbers or sequence numbers, and may deliver the processed RLC PDUs to the PDCP device regardless of the order thereof (out-of-sequence delivery). In the case of a segment, the NR RLC may receive segments which are stored in a buffer or are to be received later, reconfigure the segments into one complete RLC PDU, and then process the complete RLC PDU and deliver the same to the PDCP device. The NR RLC layer may not include a concatenation function and may perform the function in the NR MAC layer or may replace the function with a multiplexing function of the NR MAC layer.

In the above description, the out-of-sequence delivery function of the NR RLC device refers to a function of directly delivering, to the upper layer regardless of order, the RLC SDUs received from the lower layer. The out-ofsequence delivery function of the NR RLC device and may include a function of reassembling and transferring, when a single RLC SDU is divided into multiple RLC SDUs and received, the divided multiple RLC SDUs, and a function of recording lost RLC PDUs by storing RLC SNs or PDCP SNs of received RLC PDUs and reordering the received RLC PDUs.

The NR MAC 1*d*-15 or 1*d*-30 may be connected to multiple NR RLC layer devices configured in one UE, and the main functions of the NR MAC may include some of the following functions:

Mapping between logical channels and transport channels;

Multiplexing/demultiplexing of MAC SDUs;

Scheduling information reporting;

Error correction through HARQ;

Priority handling between logical channels of one UE;

Priority handling between UEs by means of dynamic scheduling;

MBMS service identification;

Transport format selection; and

Padding.

The NR PHY layer 1*d*-20 or 1*d*-25 may channel-code and modulate upper layer data, convert into OFDM symbols to be transmitted over a wireless channel, or demodulate and channel-decode OFDM symbols received through the wireless channel to be transmitted to an upper layer.

Figure 1E:
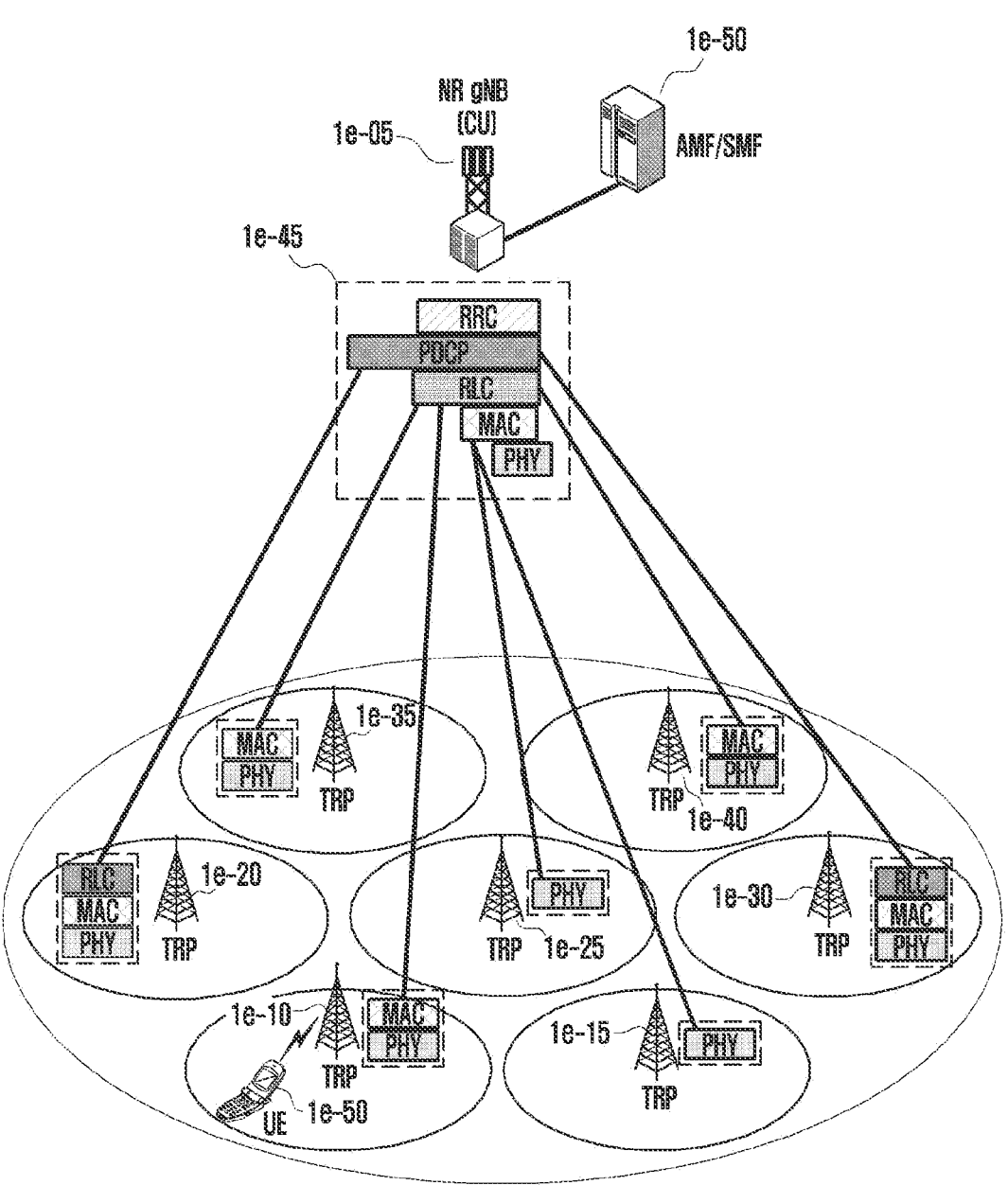
FIG. 1E illustrates a structure of another next-generation mobile communication system according to an embodiment of the disclosure.

FIG. 1E illustrates a structure of another next-generation mobile communication system according to an embodiment of the disclosure.

Referring to FIG. 1E, a cell serviced by an NR gNB 1*e*-05 operating based on beamforming may include multiple transmission reception points (TRPs) 1*e*-10, 1*e*-15, 1*e*-20, 1*e*-25, 1*e*-30, 1*e*-35, and 1*e*-40. The TRPs 1*e*-10 to 1*e*-40 are blocks in which some functions of transmitting and receiving physical signals are separated from a legacy NR base station (eNB) and may include multiple antennas. The NR gNB 1*e*-05 and the TRP may be referred to as a central unit and a distributed unit, respectively. The functions of the NR gNB 1*e*-05 and the TRP may be configured by separating each layer from PDCP/RLC/MAC/PHY layers, such as 1*e*-45. That is, the TRPs may perform a function of the corresponding layer only using the PHY layer 1*e*-15 and 1*e*-25, the TRPs may perform the function of the corresponding layers only using the PHY layer and the MAC layer 1*e*-10, 1*e*-35, and 1*e*-40, and the TRPs may perform the function of the corresponding layers only using the PHY layer, the MAC layer, and the RLC layer 1*e*-20 and 1*e*-30. Particularly, the TRPs 1*e*-10 to 1*e*-40 may use a beamforming technology of transmitting/receiving data by generating narrow beams in multiple directions by using multiple transmitting/receiving antennas. The UE 1*e*-50 accesses the NR gNB 1*e*-05 and an external network through the TRPs 1*e*-10 to 1*e*-40. In order to provide users with a service, the NR gNB 1*e*-05 aggregates and schedules state information, such as the buffer state of UEs, the available transmission power state, and channel state, thereby supporting connection between the UEs and a core network (CN), especially, the AMF/SMF e-50.

The TRPs used throughout the disclosure may use a structure 1*e*-15 and 1*e*-25 capable of performing functions of the corresponding layers only using the PHY layer.

In the disclosure, considering the case in which PUSCH repetition is performed in TRPs in the form of TDM in a state where multiple TRPs are configured in a next-generation mobile communication system, the UE actually performs transmission in different time resources for each TRP and physical channels are different, and thus the size of transmission power is also different. There is a need for the UE to transmit to the base station how much idle transmittable power is available for each TRP, and a method for supporting this will be described below. Especially, the disclosure will be focused on a method of a UE for reporting that PHR is triggered in a state in which a specific carrier or cell group is configured of a PHR report through multiple TRPs in a situation where carrier aggregation (CA) and dual connectivity (DC) are configured. The multiple TRPs cited throughout the disclosure indicate two TRPs but are not limited to the two TRPs (so that it may be applied to future expansion).

Hereinafter, in describing the disclosure, a situation that a UE receives data through an arbitrary forward downlink (DL) carrier or transmit data through an arbitrary backward uplink (UL) carrier may have the same meaning as transmitting/receiving data by using a center frequency characterizing the carrier and a control channel and a data channel provided by a cell corresponding to a frequency band. Hereinafter, an embodiment of the disclosure will assume an LTE system for convenience, but the disclosure may be applied to various wireless communication systems which support carrier aggregation (CA).

In addition, as uplink transmissions (i.e., transmissions from a UE to a base station) through different cells are likely to cause interference to each other regardless of whether carrier aggregation is used or not, it is necessary to control the uplink transmission power to a proper level. For this purpose, the UE calculates an uplink transmission power with a predetermined function and performs an uplink transmission at the calculated uplink transmission power. For example, the UE calculates a required uplink transmission power value by inputting scheduling information, such as allocated transmission resources amount and modulation and coding scheme (MCS) to be applied, and input values, such as pathloss value, capable of estimating channel condition to the predetermined function and performs an uplink transmission by applying the calculated required uplink transmission power value. The uplink transmission power value applicable by the UE is limited by the maximum transmission power value of the UE and, if the calculated required transmission power value is greater than the maximum transmission power value of the UE, the UE performs the uplink transmission by applying the maximum transmission power value. In this case, the insufficient uplink transmission power may cause uplink transmission quality degradation. Accordingly, it is preferable for the base station to perform scheduling such that the required transmission power does not exceed the maximum transmission power. However, since the base station may not measure a few parameters, such as pathloss, the UE reports its power headroom (PH) state to the base station by transmitting a power headroom report (PHR), if necessary.

The power headroom is affected by 1) allocated transmission resource amount, 2) MCS for uplink transmission, 3) pathloss on related downlink carrier, and 4) accumulated value of transmission power control commands. Here, the pathloss (PL) and accumulated value of transmission power control commands vary depending on uplink carrier and thus, if multiple uplink carriers are aggregated to one UE, it is preferable to determine whether to transmit the PHR per uplink carrier. However, for an efficient PHR transmission, it may be possible to report all PHs of multiple uplink carriers through one uplink carrier. According to the operation strategy, the PH may be necessary for the carriers on which there is no real PUSCH transmission. In this case, it may be more efficient to report all PHs for the multiple uplink carriers through one uplink carrier. For this purpose, the legacy PHR may be extended. Multiple PHs to be included in one PHR may be configured according to a predetermined ordering rule.

A PHR is triggered when pathloss on a connected downlink carrier is equal to or greater than a predetermined reference value, a prohibit PHR timer expires, or a predetermined time period elapses after the PHR is generated. Although the PHR is triggered, the UE does not transmit the PHR immediately, but waits until the arrival of an available uplink transmission timing, for example, until a time point in which the uplink transmission is allocated. This is because the PHR is not information to be processed urgently.

Figure 1F:
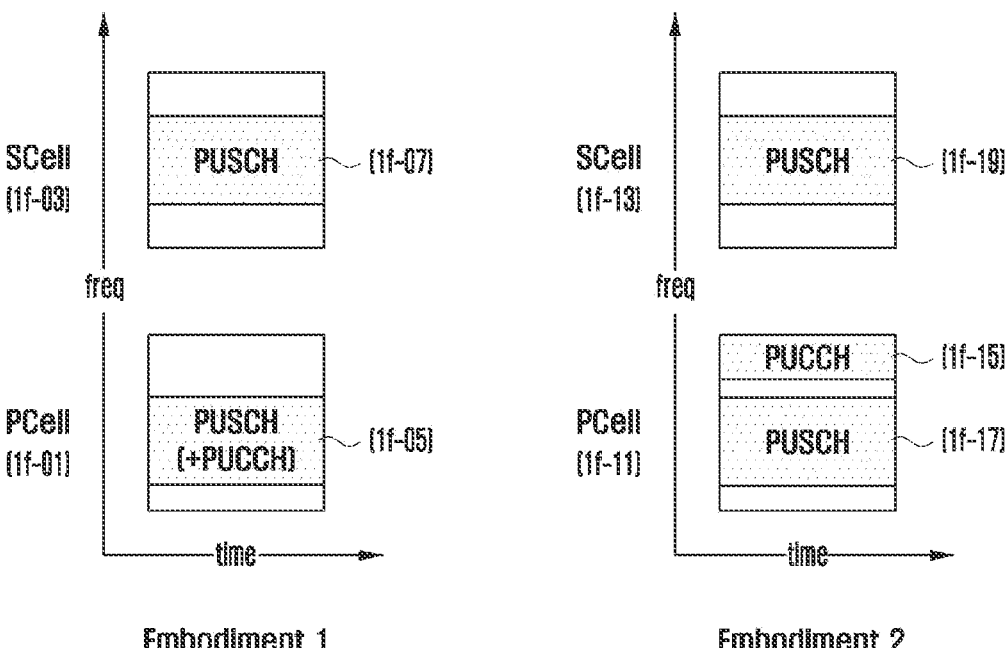
FIG. 1FA illustrates an uplink transmission method in accordance with configuration and uplink types according to an embodiment of the disclosure.

FIG. 1FA to FIG. 1FB illustrate an uplink transmission method in accordance with configuration and uplink types according to an embodiment of the disclosure.

Example 1 of FIG. 1FA to FIG. 1FB depicts a scenario where a UE is configured with two serving cells, that is, a PCell 1f-01 and an SCell 1f-03, to perform uplink transmission as scheduled by a base station. In this scenario, the UE may not transmit the above-described PUCCH and PUSCH simultaneously in one serving cell because of transmission scheme limitation and RF structural limitation. Accordingly, the UE transmits a PUSCH having a PUCCH embedded therein (1f-05). Here, the PUCCH information is transmitted through the PCell and, if there is no PUSCH to be transmitted through the PCell, through the SCell with the lowest index among SCells. The aforementioned PHR message is transmitted as part of the PUSCH and, in this scenario, the UE needs to report just the PH value obtained by subtracting the transmission power for PUSCH transmission 1f-05 or 1f-07 from the maximum transmission power (PCMAX,c) per serving cell. This is referred to as Type 1 PH.

Likewise, Example 2 depicts a scenario where a UE is configured with two serving cells, that is, a PCell 1f-11 and an SCell 1f-13, to perform uplink transmission as scheduled by a base station. In this scenario, the UE has a capability of transmitting PUCCH and PUSCH simultaneously through one serving cell or transmitting PUCCH and PUSCH separately using the above-described uplink transmission technology capable of simultaneous transmission. For the case of the PCell (or identical to the SCell in case of being capable of transmitting PUSCH), it is necessary for the UE to report the PH value obtained by subtracting the transmission power for PUCCH transmission 1f-15 as well as the transmission power for the PUSCH transmission 1f-17 from the maximum transmission power (PCMAX,c) for the PCell in consideration of PUSCH transmission as well as PUCCH transmission. This is referred to as Type 2 PH.

In case of reporting the Type 1 or Type 2 power headroom, the UE reports using an MAC control element (CE) which is a control massage of the MAC layer and, more specifically, using a single entry PHR MAC CE format 1f-21 or a multiple entry PHR MAC CE format 1f-31. In case that a single carrier is used, the UE reports using the single entry PHR format and in case that the dual connectivity is configured (or CA is configured), the UE reports using the multiple Entry PHR MAC CE format.

In case that the single entry PHR MAC CE format is used, the UE transmits power headroom 1f-23 for the corresponding serving cell (because a single carrier is used) and PCMAX,f,c 1f-25 corresponding to the maximum transmission power of the corresponding serving cell.

The power headroom values are used for indicating one within a range from—32 dB to 38 dB as shown in a table below and indicate available transmission outputs.

TABLE 1

| Reported value | Measured quantity value (dB) |
|---|---|
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| . . . | . . . |
| POWER_HEADROOM_53 | 20 ≤ PH < 21 |
| POWER_HEADROOM_54 | 21 ≤ PH < 22 |
| POWER_HEADROOM_55 | 22 ≤ PH < 24 |
| POWER_HEADROOM_56 | 24 ≤ PH < 26 |
| POWER_HEADROOM_57 | 26 ≤ PH < 28 |
| POWER_HEADROOM_58 | 28 ≤ PH < 30 |
| POWER_HEADROOM_59 | 30 ≤ PH < 32 |
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

The UE calculates the available transmission power using the same or equivalent formula as below:

$$PH_{type1b,f,n}(i,j,q_d,l)=P_{CMAX,f,c}(i)-\{P_{0\_PUSCH,b,f,c}(j)+10$$
$$\log_{10}(2^{\mu}-M_{RB,b,f,c}^{PUSCH}(i))+\alpha_{b,f,p}(j)PL_{b,f,c}(q_d)+$$
$$\Delta_{TF,b,f,c}(i)+f_{b,f,c}(i,l)\}$$

[dB].

According to the equation above, in case that PUSCH transmission is performed at time point i through a serving cell c (frequency f), PH(i) is calculated with the maximum uplink transmission power PCMAX,f,c(i), the number of resource blocks MPUSCHRB,b,f,c(i), power offset ΔTF,c(i) derived from the MCS, and pathloss PLc, and fc(i) (accumulated TPC commands). In the equation above, PLc denotes the pathloss in the cell for which pathloss is supposed to be provided for serving cell c. The pathloss for use in determining an uplink transmission power of an arbitrary serving cell is a pathloss on the downlink channel of the corresponding cell or the pathloss on the downlink channel of another cell. Which pathloss is to be used is selected and notified by the base station to the UE through an RRC layer message.

In case that the UE uses multiple beams in one cell, the base station informs the UE of which beam or reference signal is to be selected, measured, and calculated. In the equation, fc(i) denotes the accumulated value of TPC commands for serving cell c. In the equation, PO_PUSCH,C denotes a higher layer parameter obtained by summing a cell-specific value and a UE-specific value. Typically, PO_PUSCH,C has various values according to the transmission type of PUSCH, such as semi-persistent scheduling, dynamic scheduling, and random access response. In the equation, αc is 3-bit cell-specific value denoting a weight that is applied to the pathloss for use in calculating the uplink transmission power (i.e., as this value increases, the impact of the pathloss to the uplink transmission power calculation increases), and its value is limited according to the transmission type of the PUSCH. In the equation, value j denotes the type of PUSCH. That is, j is set to 0 for semi-persistent scheduling, 1 for dynamic scheduling, and 2 for random access response. In the above equation, in case that there is no physical uplink shared channel (PUSCH) transmission in a certain serving cell, according to the definition, MPUSCH and ΔTF may not be applied in the equation.

Meanwhile, PCMAX,f,c which is the maximum transmission power in a serving cell c (frequency f) is determined between PCMAX_L,f,c and PCMAX_H,f,c as shown in the equation below or by using an equation corresponding thereto:

$$P_{CMAX\_L,f,c}\leq P_{CMAX,f,c}\leq P_{CMAX\_H,f,c} \text{ with}$$
$$P_{CMAX\_L,f,c}=\text{MIN}\{P_{EMAX,c}-\Delta T_{C,c},(P_{PowerClass}-$$
$$\Delta P_{PowerClass})-\text{MAX}(\text{MAX}(MPR_c,A-$$
$$MPR_c)+T_{IB,c}+\Delta T_{C,c}+\Delta T_{RxSRS},P-MPR$$
$$_c)\}P_{CMAX\_H,f,c}=\text{MIN}\{P_{EMAX,c},P_{PowerClass}-$$
$$\Delta P_{PowerClass}\}$$

In the equation above, the maximum value PCMAX_H, f,c of PCMAX,f,c is determined as the minimum value between a value of PEMAX,c which is directly transmittable by the base station and a value of PPowerClass−ΔPowerClass which has been determined for each frequency band. In the equation above, the minimum value PCMAX_L,f,c of PCMAX,f,c is determined as a value reduced according to the additional factor among the respective maximum values. For example, TC,c=1.5 dB may be reduced from a value of PEMAX,c which is directly transmittable by the base station depending on a condition for each band and in consideration of values considering a maximum power reduction (MPRc) determined according to the transmission modulation and transmission bandwidth of the UE and an additional maximum power reduction (A-MPRc) value (or network signaling (NS) value) determined according to signaling transmitted from the base station to the UE to reduce interference in neighboring bands, etc., and in consideration of a power management maximum power reduction (P-MPRc) value used for the purpose of reducing the transmission power to satisfy the demanded value for electromagnetic wave energy absorbed by the human body, the minimum value of the maximum transmission power of the UE may be reduced from the value of PPowerClass−ΔPowerClass which is determined for each frequency band based on a larger value among the considered values. For example, in case of a system operating at high frequencies, such as an NR system, the UE may perform transmission using high power and the transmission using high power may cause harm to the human body, and thus there is need for adjusting the maximum transmission value according to the demand for regulating the aforementioned case. The case in which the minimum value of the maximum transmission power is adjusted according to the P-MPRc value is referred to as power backoff caused by the power management.

In case that multiple entry PHR MAC CE format 1f-31 is used, the UE informs which serving cell the power headroom is to be reported through a bitmap (1f-33), the power headroom is reported as 1f-41, 1f-51, 1f-61, and the like for the cell informed of reporting and unconditionally reported serving cells, and if reporting is required, the corresponding PCMAX,f,c value is reported together (1f-43)(1f-53)(1f-63). In case of reporting the power headroom, the UE reports using a field having a length of 6 bits as shown in the drawing, and has a value shown in the table below. The value of the actual transmission power corresponding to each PH value refers to the value defined in TS 38.133.

TABLE 2

Table 6.1.3.8-1: Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |

TABLE 2-continued

| Table 6.1.3.8-1: Power Headroom levels for PHR | |
| --- | --- |
| PH | Power Headroom Level |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

TABLE 3

| Table 6.1.3.8-2: Nominal UE transmission power level for PHR | |
| --- | --- |
| $P_{CMAX,r,c}$ | Nominal UE transmission power level |
| 0 | PCMAX_C_00 |
| 1 | PCMAX_C_01 |
| 2 | PCMAX_C_02 |
| . . . | . . . |
| 61 | PCMAX_C_61 |
| 62 | PCMAX_C_62 |
| 63 | PCMAX_C_63 |

TABLE 4

| Table 6.1.3.8-3: Effective power reduction for MPE P-MPR | |
| --- | --- |
| MPE | Measured P-MPR value |
| 0 | P-MPR_00 |
| 1 | P-MPR_01 |
| 2 | P-MPR_02 |
| 3 | P-MPR_03 |

In addition, in the case of the single/multiple entry PHR MAC CE format 1*f*-21 or 1*f*-31, there are additional P bit 1*f*-22 or 1*f*-35 and V bit 1*f*-37.

In the case of P bit, when the maximum transmission power value of the corresponding serving cell becomes lower than the original value due to power backoff caused by the aforementioned power management, P bit is configured to 1 and reported to the base station, so that the base station may be informed that the value of P CMAX,f,c reported by the UE for the corresponding serving cell is an adjusted value for the above reason.

In the case of V bit, the UE actually performs uplink transmission and does not perform uplink transmission for each serving cell according to scheduling information for each serving cell at a time point at which the multiple entry PHR MAC CE report is performed. V bit is configured to 0 in case of actual transmission and the report is performed by calculating the PH value is calculated and reported according to the actual transmission. V bit is configured to 1 in case of no transmission and a value calculated under the assumption that predetermined virtual transmission is performed is reported as PH. The virtual transmission is referred to as a PUSCH reference format.

Accordingly, when performing PHR for each activated cell configured by the base station to the UE, the UE generate a value by using a table according to the corresponding cell type and performs the reporting to the base station even if the same PH report field is used in the multiple entry PHR format according to RAT and operation frequency of the corresponding cell.

Additionally, MPE fields 1*f*-24 and 1*f*-39 are introduced for single/multiple entry PHR MAC CE.

An MPE value is an indicator indicating whether power backoff satisfies MPE constraint for FR2 and four values shown in Table 6.1.3.8-3 may be indicated. See TS 38.133 for actual MPE values.

Conditions for time to transmit the PHR to the base station, that is, whether to trigger a report may be defined, and the following conditions may be commonly defined for NR systems:

Condition 1: In case that downlink reception magnitude change of a serving cell belonging to any MAC entity configured in the UE occurs is greater than or equal to phr-Tx-PowerFactorChange dB in a state in which prohibitPHR-Timer is expired.

That is, for MCG in the DC scenario, even when a signal magnitude change occurs in one of SCG serving cells, the PHR report is performed through the MCG:

Condition 2: In case that phr-PeriodicTimer (of the corresponding MAC entity) is expired;

Condition 3: In case that the PHR report is initially configured;

Condition 4: In case that a Scell including uplink to which any MAC entity belongs is activated;

Condition 5: In case that a primary cell (PSCell) of a SCG is added or changed when a dual connectivity technology is used; And Condition 6: In case that there are resources for uplink transmission of a serving cell belonging to any MAC entity configured in the UE in a state in which prohibitPHR-Timer expires, a size of an amount of transmission power to be reduced according to power backoff caused by the power control described above is required greater than or equal to phr-Tx-PowerFactorChange compared to a previously reported value of the PHR MAC CE.

Furthermore, start conditions for phr-PeriodicTimer in the above-described procedure are as follows:

A timer (phr-PeriodicTimer) starts in case that a first uplink resource is allocated for new transmission after a MAC reset is performed; and In case that a MAC entity generates a PHR MAC CE and the PHR MAC CE includes a PHR, phr-PeriodicTimer restarts.

In case that the PHR triggering condition occurs in each base station according to the conditions, the UE generates and performs a PHR to the corresponding base station. However, in case that the above-mentioned dynamic power sharing is not supported and the PHR is triggered by an event that occurred in a MAC entity other than a MAC entity of the UE, even if the UE performs the PHR, a power headroom value of the serving cells belonging to the corresponding MAC entity may not be reported, and accordingly, only the PHR value belonging to the MAC entity of the UE may be transmitted unnecessarily.

FIG. 1G illustrates a case of supporting physical uplink shared channel (PUSCH) repetition using multiple transmission reception points (TRPs) according to an embodiment of the disclosure.

More specifically, FIG. 1G shows a scenario considered by the disclosure, in which multiple TRPs are used for supporting PUSCH retransmission.

A UE 1*g*-05 may transfer an SRS resource to a base station 1*g*-10 according to configured sounding reference signal (SRS) resource sets, and in this case, the SRS resource sets 1g-15 and 1g-20 are separately configured specific for TRP 1 and TRP 2. In addition, an SRS resource indicator (SRI) and a transmitted precoding matrix indicator may be also provided for each TRP through a configuration of the base station 1g-10. The base station may indicate the UE 1g-05 pathloss for PUSCH transmission and PUSCH retransmission using a TRP for each serving cell and in this case, enhanced DCI (eDCI) may be used.

That is, according to the configuration and procedure, the UE 1g-05 may perform PUSCH retransmission of TRP1 and TRP2 through time division multiplexing (TDM). Here, PUSCH retransmission 1g-45 or 1g-55 through TRP1 and PUSCH retransmission 1g-50 or 1g-60 through TRP2 may be performed according to an indicated signaling order and configuration. The order of PUSCH retransmission through TRP1 and TRP2 is not determined and may be changed by configuration or signaling. However, PUSCH retransmissions 1g-45 and 1g-55 through TRP1 are associated with SRI1 indicated in the eDCI, and PUSCH retransmissions 1g-50 and 1g-60 through TRP2 are associated with SRI2 indicated in the eDCI.

Figure 1H:
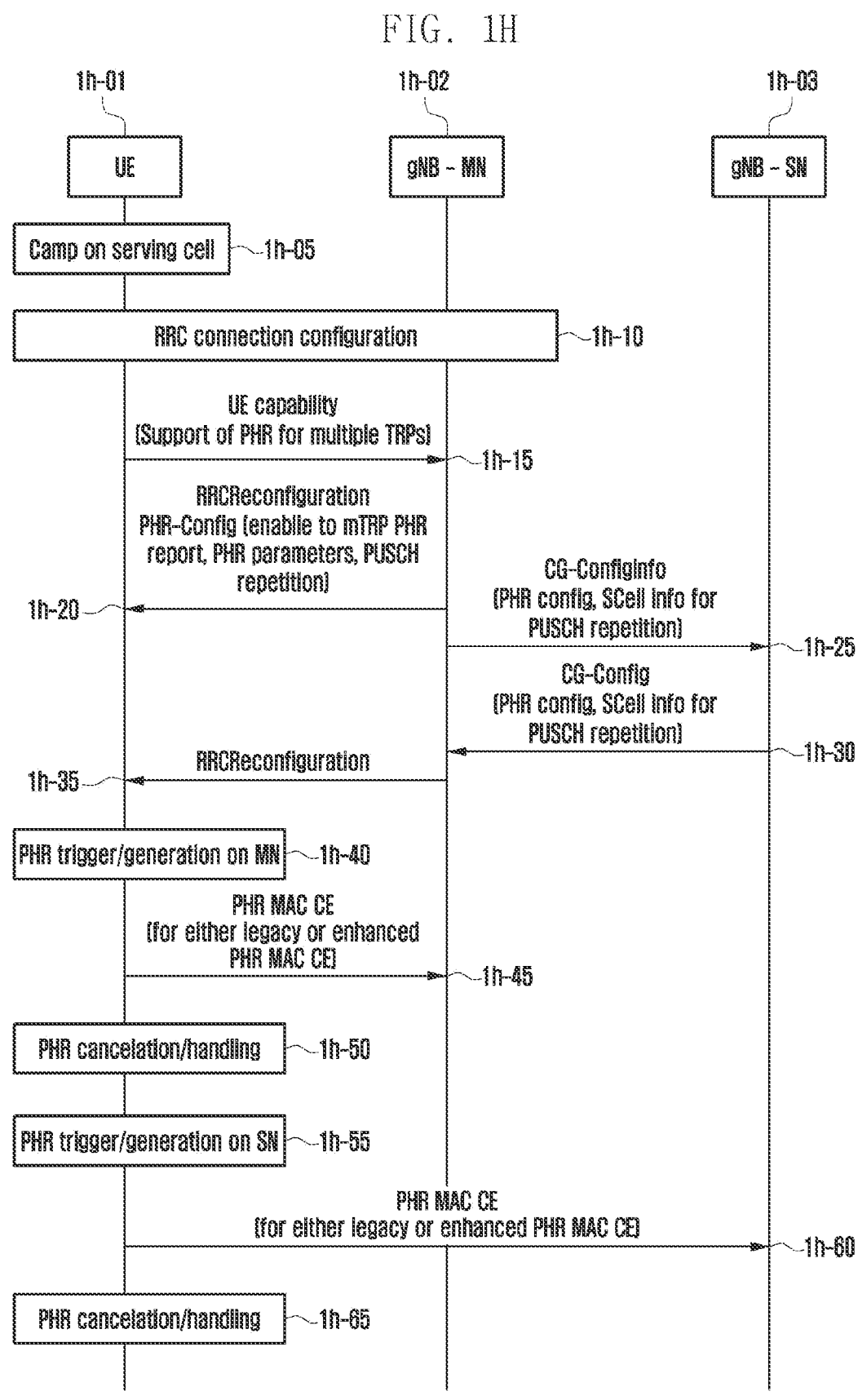
FIG. 1H illustrates whole operations of performing a PHR for each TRP in case that PUSCH repetition is performed through multiple TRPs according to an embodiment of the disclosure.

FIG. 1H illustrates whole operations of performing a power headroom report (PHR) for each transmission reception point (TRP) in case that physical uplink shared channel (PUSCH) repetition is performed through multiple TRPs according to an embodiment of the disclosure.

More specifically, FIG. 1H is a diagram illustrating whole operations for performing a power headroom report for each TRP in case that PUSCH repetition is performed through multiple TRPs applied to an embodiment of the disclosure. FIG. 1H depicts a case in which DC is configured and the whole operations may be applied to a case in which CA is configured.

The UE 1h-01 camps on a specific base station 1h-02 (1h-05), and performs connection configuration with a corresponding serving cell in operation 1h-10. In operation 1h-15, the UE transfers UE capability to the corresponding base station and the terminal capability may include information that the UE is capable of transferring PHR for PUSCH repetition through the multiple TRPs described the disclosure. The corresponding UE capability may be signaled with an indicator for each UE, or signaled for each band and band combination.

In operation 1h-20, the base station provides PHR-related configuration along with basic RRC configuration information through RRC configuration to the UE. Following parameters related to RRC configuration for PHR transmission through multiple TRPs may be included, and the following parameters may be configured for each UE, each cell/band-width part (BWP), MAC entity (cell group) or the like by using PHR configuration.

1. PHR configuration (PHR-Config) for each MAC entity (cell group):
   multiTRP-PHR (twoPHRMode field): Indicator for activating PHR report with respect to TRPs to the UE;
   phr-PeriodicTimer: PHR Periodical timer which is commonly applied to a PHR report with respect to TRP1 and TRP2;
   phr-Tx-PowerFactorChange: A power change reference threshold value which is commonly applied to a PHR report with respect to TRP1 and TRP2; and
   mpe-related application and mpe-related parameter (e.g., mpe-Reporting-FR2).

2. Configuration for each serving cell/BWP (PUSCH-Config):
   PUSCH repetition-related configuration: Configuration related to PUSCH repetition through multiple TRPs.

Specifically, as may be identified in the configuration, although the configuration for indicating the PHR report with respect to the multiple TRPs is indicated for each MAC entity (cell group), the actual configuration of the PUSCH repetition through the multiple TRPs is configured for each serving cell. That is, in case that the PHR report is configured with respect to the multiple TRPs without the configuration of the PUSCH repetition through the multiple TRPs in a specific serving cell, the PHR report through the multiple TRPs may not be performed in the corresponding serving cell. The disclosure suggests methods for applying a PHR report through multiple TRPs and a serving cell-based PHR report by the UE in this case.

Thereafter, operations 1h-25 and 1h-30, the base station may perform an inter-node RRC message exchange procedure for DC configuration. In operation 1h-25, a master node (MN) transfers a CG-Configinfo message including configuration information in the MN and information requested to an SN to the secondary node (SN). The message may transfer the PHR-related configuration (whether twoPHR-Mode is configured in the MN, or the like) configured to the UE in operation 1h-20, PUSCH repetition-related configuration information (information on a serving cell in which multiple PUSCH repetitions is configured, PUSCH repetition-related configuration, and the like) and the like. In operation 1h-30, the SN may transfer a CG-Config message including response information to the configuration information and information requested from the MN to the MN. The message may transfer the PHR-related configuration (whether twoPHRMode is configured in the SN, or the like) configurable to the UE by the SN, and PUSCH repetition-related configuration information (information on a serving cell in which multiple PUSCH repetitions is configured, PUSCH repetition-related configuration, and the like).

In operation 1h-35, in case that the RRC configuration updated through the inter-node RRC message procedure in operations 1-25 and 1h-30 is required, the base station may transfer the RRC configuration to the UE. By way of example, DC-related configuration, such as SN configuration or addition, may be included and configuration change of the MN may be transferred together.

In operation 1h-40, the UE performs uplink transmission according to the configuration received through the base station and perform PHR trigger and generation while checking the PHR triggering condition received from each cell group. The PHR triggering condition considered in the disclosure is identical to the above-described legacy PHR triggering condition and for the PHR in multiple TRPs, the PHR triggering condition is independently checked by sharing the configured PHR-related parameters. In addition, in a DC situation, PHR configuration information configured in each cell group is independently applied. Operation 1h-40 shows a case in which PHR triggering occurs according to the PHR configuration configured in the MN.

In operation 1h-45, the UE inserts the generated PHR MAC CE into the MAC PDU and transfers the same to the base station according to an uplink grant resource. In operation 1h-45, the PHR MAC CE may correspond to a legacy PHR MAC CE or a new enhanced PHR MAC CE (for the PHR report with respect to multiple TRPs) and may have a form of one PHR MAC CE including a report for serving cells in which PUSCH repetition with respect to multiple TRPs is not configured in a CA and DC configuration state and a PHR report with respect to multiple TRPs. Alternatively, under the assumption that dynamic power sharing is not applied, the PHR MAC CE only including a PH report for serving cells belonging to each cell group in the PHR MAC CE may be transferred. In embodiments of the disclosure below, two methods mentioned above will be described in detail. Specifically, the legacy PHR MAC CE format 1*f*-21 or 1*f*-31 may be used for a case in which the PHR report is not configured with respect to multiple TRPs, and in case that the PHR report is not configured with respect to multiple TRPs, a new PHR MAC CE format suggested by an embodiment of the disclosure may be used.

In operation 1*h*-50, the UE may cancel a pending PHR depending on which PHR MAC CE has been transferred or for which TRP the PHR information is included in the transmitted MAC CE. This may be a case in which a PHR for a corresponding serving cell and a TRP is regenerated and pending before the PHR MAC CE is transmitted.

Operations subsequent to the FIG. 1H is a procedure illustrating that PHR triggering and transmission procedures are performed independently in the SN. The PHR operations in the corresponding MNs 1*h*-40 to 1*h*-50 and SNs 1*h*-55 to 1*h*-65 are performed independently and may be performed at the same time or in a different order though shown in order in the drawing.

In operation 1*h*-55, the UE performs uplink transmission according to the configuration received through the base station and perform PHR trigger and generation while checking the PHR triggering condition received from each cell group. The PHR triggering condition considered in the disclosure is identical to the above-described legacy PHR triggering condition and for the PHR in multiple TRPs, the PHR triggering condition is independently checked by sharing the configured PHR-related parameters. In addition, in a DC situation, PHR configuration information configured in each cell group is independently applied. Operation 1*h*-55 shows a case in which PHR triggering occurs according to the PHR configuration configured in the SN.

In operation 1*h*-60, the UE inserts the generated PHR MAC CE into the MAC PDU and transfers the same to the base station according to an uplink grant resource. In operation 1*h*-45, the PHR MAC CE may correspond to a legacy PHR MAC CE or a new enhanced PHR MAC CE (for the PHR report with respect to multiple TRPs) and may have a form of one PHR MAC CE including a report for serving cells in which PUSCH repetition with respect to multiple TRPs is not configured in a CA and DC configuration state and a PHR report with respect to multiple TRPs. Alternatively, under the assumption that dynamic power sharing is not applied, the PHR MAC CE only including a PH report for serving cells belonging to each cell group in the PHR MAC CE may be transferred. In embodiments of the disclosure below, two methods mentioned above will be described in detail. Specifically, the legacy PHR MAC CE format 1*f*-21 or 1*f*-31 may be used for a case in which the PHR report is not configured with respect to multiple TRPs, and in case that the PHR report is not configured with respect to multiple TRPs, a new PHR MAC CE format suggested by an embodiment of the disclosure may be used.

In operation 1*h*-65 the UE may cancel a pending PHR depending on which PHR MAC CE is transferred or for which TRP the PHR information is included in the transmitted MAC CE. This may be a case in which a PHR for a corresponding serving cell and a TRP is regenerated and pending before the PHR MAC CE is transmitted.

Hereinafter, a new MAC CE format suggested by the disclosure will be described according to various embodiments. In case that CA is configured, a cell-based PHR report for serving cells in which PUSCH repetition with respect to multiple TRPs is not configured and a PHR report for multiple TRPs of serving cells in which PUSCH repetition with respect to multiple TRPs is configured may coexist. Furthermore, in case that DC is configured, PHR report configurations for multiple TRPs may be different for each cell group. That is, a PHR report for multiple TRPs is indicated to one cell group and a PHR report for multiple TRPs is not configured to the other cell group.

The case described above may have a form of including different types of PH reports (a cell-based PH report and a TRP-based PH report) in one PHR MAC CE. Alternatively, under the assumption that dynamic power sharing is not applied, the PHR MAC CE only including a PH report for serving cells belonging to each cell group in the PHR MAC CE may be transferred. Hereinafter, in an embodiment of the disclosure, detailed PHR operations and a MAC CE structure will be suggested according to the above-described embodiments. Specifically, the legacy PHR MAC CE format 1*f*-21 or 1*f*-31 may be used for a case in which the PHR report is not configured with respect to multiple TRPs, and in case that the PHR report is not configured with respect to multiple TRPs, a new PHR MAC CE format suggested by an embodiment of the disclosure may be used.

Figure 1I:
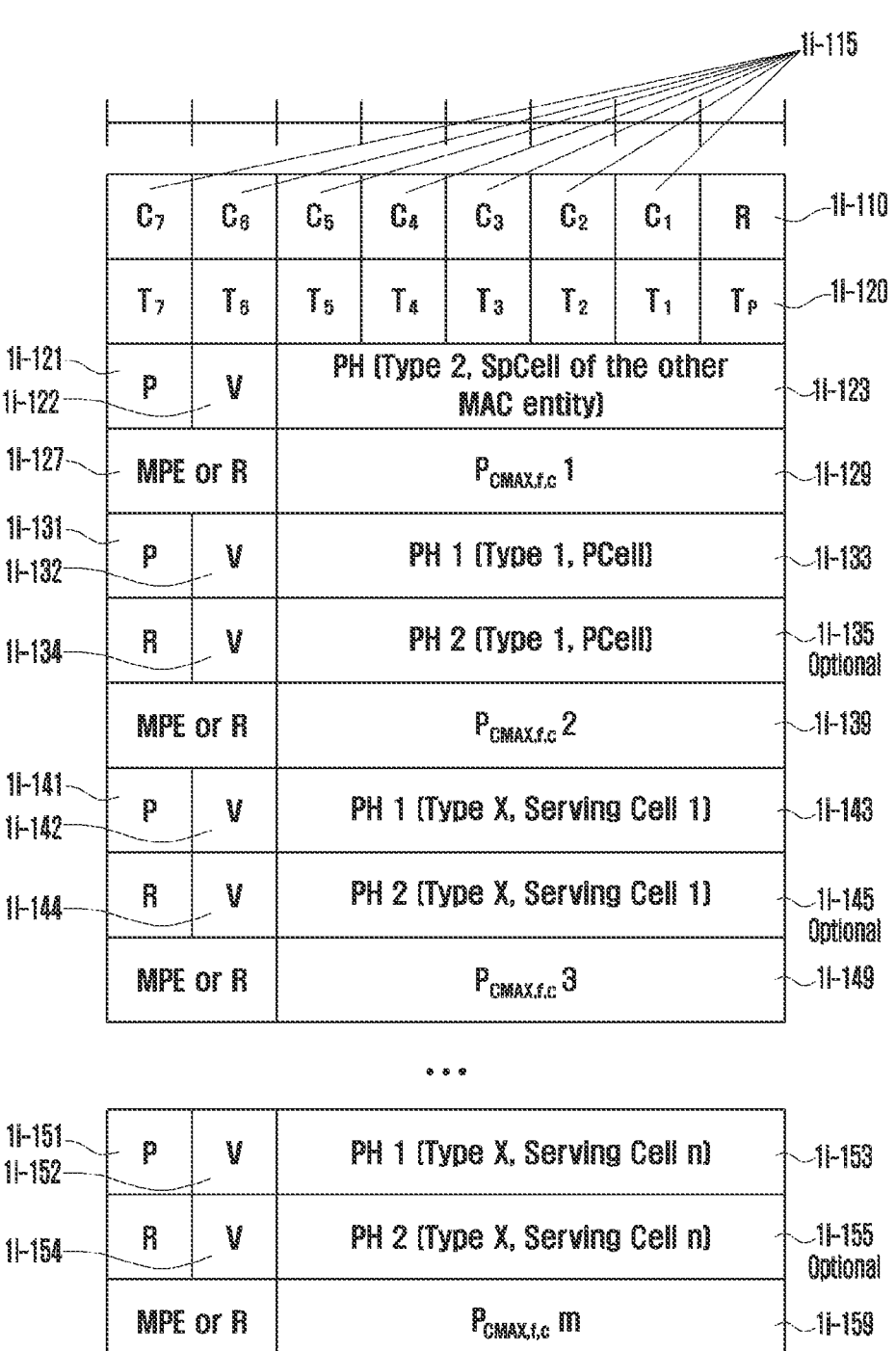
FIG. 1IA illustrates a structure and characteristic of a MAC CE with respect to multiple TRPs in case that a PHR for a cell group to which serving cells belong is performed according to an embodiment of the disclosure.

FIGS. 1IA to 1IC illustrate a structure and characteristic of a medium access control (MAC) control element (CE) with respect to multiple transmission reception points (TRPs) in case that a power headroom report (PHR) for a cell group to which serving cells belong is performed according to an embodiment of the disclosure.

More specifically, FIGS. 1IA to 1IC are diagrams of embodiment 1 of the disclosure for illustrating a structure and characteristic of a PHR MAC CE for multiple TRPs in case that only a PHR report with respect to a serving cell belonging to a cell group is reported.

An inter-node PHR report problem which may be considered in a DC situation does not need to be considered, and thus a following scenarios are considered.

1. Scenario

A case that the configuration indicating PHR report for multiple TRPs is given in a PHR configuration for a MAC entity of a cell group; and A case that PUSCH repetition may be configured for each unit of cell, PUSCH repetition is configured for a specific cell, and PUSCH repetition is not configured for some other specific remaining serving cells.

2. MAC CE Format

A. Method 1 (1*i*-05): A legacy PHR MAC CE format is extended to perform a change so as to allow a report required for PH values 1*i*-35, 1*i*-45, and 1*i*-55 for a second TRP and a PHR. The corresponding PH values may exist as an option according to the configuration;

B. Method 2 (1*i*-105): A new PHR MAC CE is introduced (new LCID/eLCID allocation) to allow one or two PH values to be reported per serving cell. Here, the case where one PH value is reported corresponds to a legacy method 1*i*-125 for a PHR report per cell and the case where two PH values are reported corresponds to a newly introduced method 1*i*-133, 1*i*-135, 1*i*-143, 1*i*-145, 1*i*-153, of 1*i*-155 for a PHR report for each TRP. Additionally, in method 2, a cell in which the PH report with respect to multiple TRPs is performed is indicated through explicit bitmap information 1*i*-120; and C. Method 3 (1*i*-205): A new PHR MAC CE is introduced (new LCID/eLCID allocation) to allow one or two PH values to be reported per serving cell. Here, the case where one PH value is reported corresponds to a legacy method 1*i*-225 for a PHR report per cell and the case where two PH values are reported corresponds to a newly introduced method 1*i*-233, 1*i*-235, 1*i*-243, 1*i*-245, 1*i*-253, of 1*i*-255 for a PHR report for each TRP. Method 3 is different from Method 2 in that the former assumes that rather than indicating a serving cell where a PH report for multiple TRPs is performed through explicit signaling, the UE may know in which cell PUSCH repetition is configured through RRC configuration, so the UE may perform a PHR MAC CE report without signaling. That is, the UE performs a cell-level PH report with respect to a serving cell in which PUSCH repetition is not configured (a PH report is not performed for TRP2), based on the received RRC configuration as in conventional methods.

In case that the multiple entry PHR MAC CE format is applied to all the above-described methods, the UE informs a serving cell in which a power headroom report is performed through the bitmaps 1*i*-15, 1*i*-115, and 1*i*-215, and the power headroom report is performed for the serving cell informed of the report and serving cells unconditionally reported by using the above-described methods. In case that a report is required, PCMAX,f,c values 1*i*-39, 1*i*-49, 1*i*-59, 1*i*-139, 1*i*-149, 1*i*-159, 1*i*-239, 1*i*-249, and 1*i*-259 corresponding thereto are reported together.

P bits 1*i*-21, 1*i*-31, 1*l*-41, 1*i*-121, 1*i*-131, 1*i*-141, 1*i*-151, 1*i*-221, 1*i*-231, 1*i*-241, and 1*i*-251 operate only on a legacy cell basis and do not operate at the TRP level. That is, an indicator for each TRP is not required and only one indicator is required for each serving cell as in conventional methods.

Vbits 1*i*-22, 1*i*-32, 1*i*-42, 1*i*-34, 1*i*-44, 1*i*-54, 1*i*-122, 1*i*-132, 1*i*-142, 1*i*-134, 1*i*-144, 1*i*-154, 1*i*-152, 1*i*-222, 1*i*-232, 1*i*-242, 1*i*-234, 1*i*-244, 1*i*-254, and 1*i*-252 are required to indicate whether actual transfer or a virtual transfer is performed depending on whether there is transmission at an actual transmission timing for each TRP. For reference, in case that there is no overlapping transmission of PUSCH in n slots to a cell in which multiple TRPs are configured in a CA situation, virtual setting is possible for both TRPs.

MPE values 1*i*-27, 1*i*-127, and 1*i*-227 also operate on a legacy cell basis like P bits.

3. Example Scenario

A PHR report through multiple TRPs is configured through PHR-Config for a cell group;

PUSCH repetition through multiple TRPs is configured in a PCell and serving cells #1, #2, and #3; and PUSCH repetition through multiple TRPs is not configured in serving cells #4 and #5.

A. Method 1: The UE knows a serving cell in which PUSCH repetition through multiple TRPs is configured, thus applies a cell-based PH report to report PH values for six cells like the legacy PHR MAC CE in case that a PHR is triggered, and additionally reports TRP2 PH values for four cells (a PCell and serving cells #1, #2, and #3).

B. Method 2: An explicit bitmap is introduced and the bitmap is set to 00001111. Here, a first cell indicates a PCell. A TRP-level PH report is performed for four cells (a PCell and serving cells #1, #2, and #3) and a cell-based PH report is formed for the remaining two cells (serving cells #4 and #5).

C. Method 3: A TRP-level PH report is performed for four cells (a PCell and serving cells #1, #2, and #3) and a cell-based PH report is formed for the remaining two cells (serving cells #4 and #5).

The CA situation is assumed in the present embodiment, and thus a description for a single entry PHR MAC CE will be omitted. Furthermore, with respect to a multiple entry PHR MAC CE, a format for the case where 8 or less cells are configured will be described. It is to be noted at the outset that a MAC CE format for 8 or more and 32 or less cells is described by easily extending a description below.

Figure 1J:
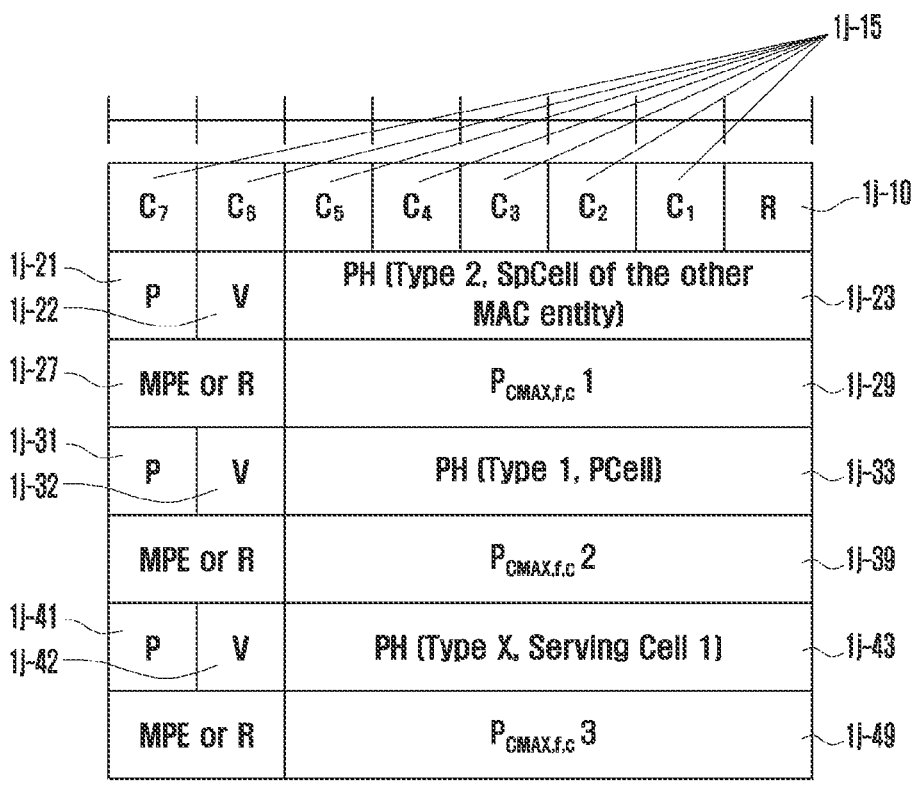
FIG. 1JA illustrates a structure and characteristic of a MAC CE with respect to multiple TRPs in case that PHRs for serving cells belonging to all cell groups are concurrently performed in a DC situation according to an embodiment of the disclosure.
Figure 1J:
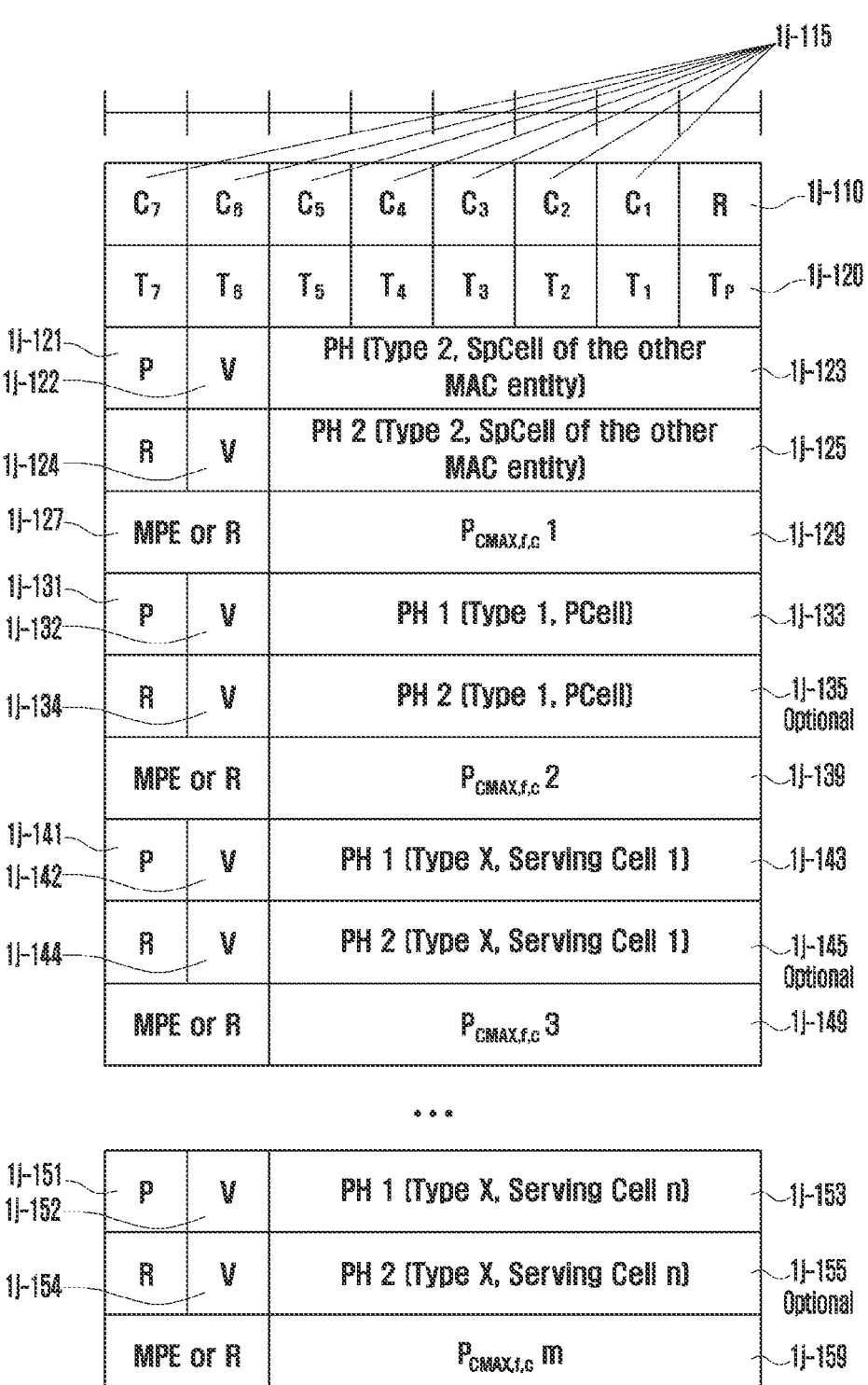
Figure 1J:
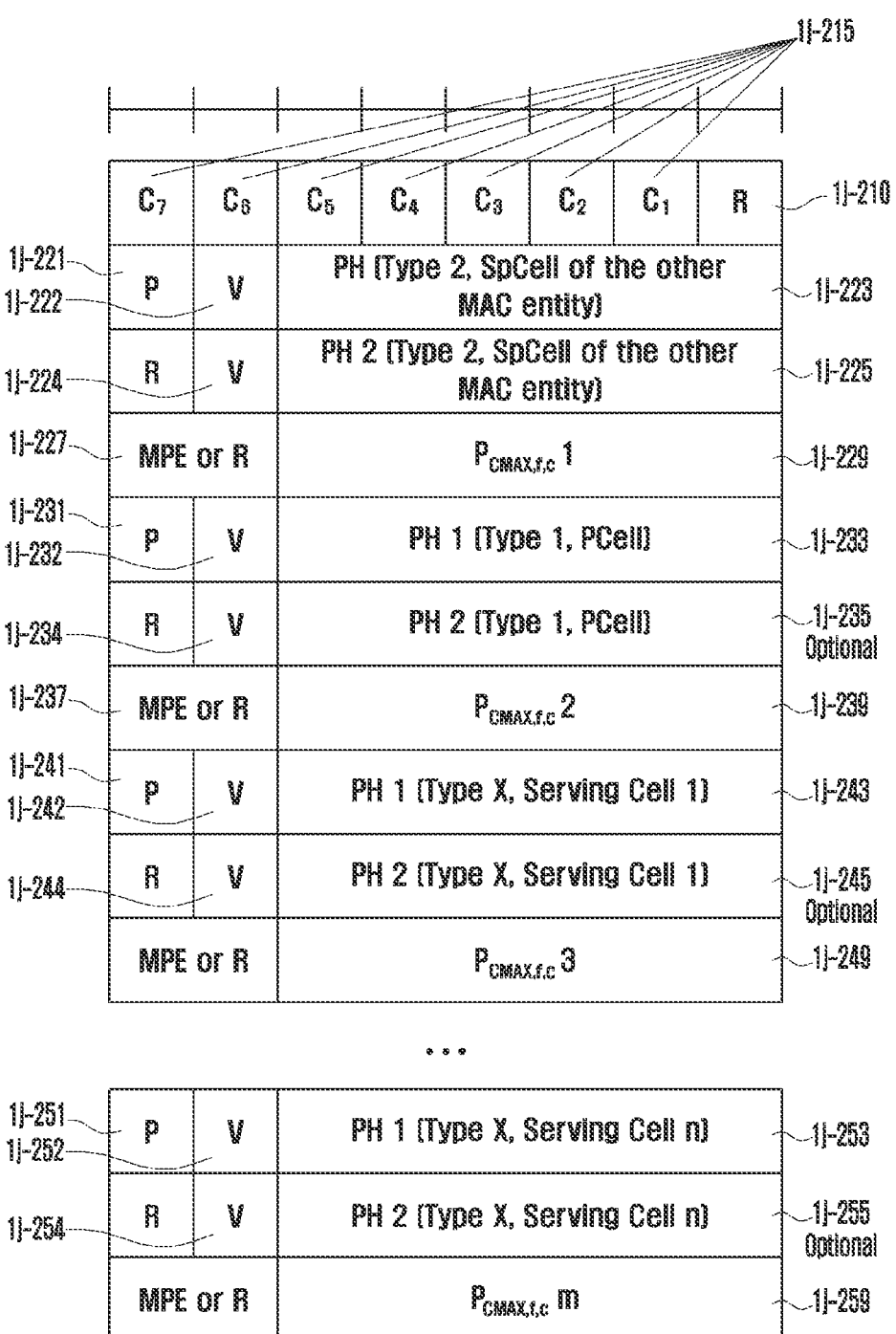

FIGS. 1JA to 1JC illustrate a structure and characteristic of a medium access control (MAC) control element (CE) with respect to multiple transmission reception points (TRPs) in case that power headroom reports (PHRs) for serving cells belonging to all cell groups are concurrently performed in a dual connectivity (DC) situation according to an embodiment of the disclosure.

More specifically, FIGS. 1JA to 1JC are diagrams of embodiment 2 of the disclosure for illustrating a structure and characteristic of a PHR MAC CE for multiple TRPs in case that PHR reports for serving cells belonging to all cell groups are performed together in a DC situation.

Embodiment 2 is characterized in that when a PHR is triggered in one cell group in a DC situation, a report is performed not only considering PH report for serving cells in each cell group, but also considering and reporting PH reports to other cell groups. Furthermore, in order to support this, inter node message exchange between cell groups is considered. Specifically, in case that one cell group is an LTE node, such as EN-DC or NE-DC, whether the corresponding function is newly introduced is required to be considered.

1. Scenario

A case that the configuration indicating PHR report for multiple TRPs is given in a PHR configuration for a MAC entities of one or two cell groups in a situation where DC is configured;

A case that PUSCH repetition may be configured for each unit of cell, PUSCH repetition is configured for a specific cell, and PUSCH repetition is not configured for some other specific remaining serving cells;

In case that a configuration indicating a PHR report with respect to multiple TRPs in two cell groups is given, a newly introduced PHR MAC CE may be applied by applying the corresponding configuration to both cell groups without significant difficulty. The embodiment focuses on the case that only one of the two cell groups includes a configuration indicating a PHR report for multiple TRPs. In this case, a legacy cell-based PH report may be applied to another cell group and thus a method for applying the new PHR MAC CE in this situation is required. Basically, a PHR report follows a configuration in a cell group in which the PHR is triggered; and.

A case of NR DC.

A. A configuration (twoPHRMode) indicating a PHR report for multiple TRPs may be provided to both cell groups. In this case, when the PHR is triggered according to the configuration, the UE calculates two PH values in both cell groups with respect to serving cells in which PUSCH repetition through multiple TRPs is configured, and adds the calculation result to the newly introduced PHR MAC CE format. In addition, the UE calculates a PHR for transmission (the legacy cell-based transmission) through one TRP with respect to serving cells in which PUSCH repetition through multiple TRPs is not configured and adds the calculation result to the newly introduced PHR MAC CE format. Hereinafter, the operation is named and referred to as a PHR support basic operation for multiple TRPs in DC.

B. Inter-node message: Transferring by each cell group node of whether a configuration (twoPHRMode) indicating a PHR report for multiple TRPs in different cell groups has been configured, information on a serving cell in which PUSCH repetition through multiple TRPs is configured, and information on a cell in which a PHR report through multiple TRPs is configured may help to receive and interpret the newly introduced PHR MAC CE:

A case of EN-DC/NE-DC.

A. Inter-node message: Transferring by each cell group node of whether a configuration (twoPHRMode) indicating a PHR report for multiple TRPs in different cell groups has been configured, information on a serving cell in which PUSCH repetition through multiple TRPs is configured, and information on a cell in which a PHR report through multiple TRPs is configured may help to receive and interpret the newly introduced PHR MAC CE.

B. The following options may be considered depending on a way to handle a PHR report for multiple TRPs in an LTE node.

1 Option 1: A case that when processing of a PHR report for multiple TRPs is not supported by the LTE node, even if processing of a PHR report for multiple TRPs is supported or configured by the NR node, the restriction that a PHR report for multiple TRPs is not supported even in EN-DC/NE-DC is specified. In this case, a legacy PHR MAC CE is applied to the LTE, and only cell-based PHR report is reported.

1 Option 2: The new PHR MAC CE format is designed to include a PH value in the LTE and a PH value in the NR, a cell-based PH report (using one TRP) is performed in the LTE as in the conventional method, and a PHR report is performed through multiple TRPs in the NR:

The LTE and the NR MAC entity use PHR MAC CE formats respectively defined therein (depending on cell groups in which PHR is triggered or not);

Triggering in the LTE MAC entity: In case that the PHR is triggered according to the PHR configuration of the LTE, the UE transfers the cell-based PH value report for both NTE and NR cells through the legacy PHR MAC CE defined in the LTE. A condition (e.g., pathloss of any cells or TRPs in the configured cell groups are changed higher than the configured threshold) related to pathloss of any TRP changes may be specified in the LTE; and Triggering in the NR MAC entity: In case that the PHR is triggered according to the PHR configuration of the NR, the UE transfers the cell-based PH value report for both NTE and NR cells through the legacy PHR MAC CE defined in the LTE. That is, the legacy cell-based PH value report is performed in cells among LTE cells and NR cells, in which a PHR report for multiple TRPs is not configured and the TRP-based PH value report is performed in cells of NR cells, in which a PHR report for multiple TRPs is configured. In this case the newly introduced PHR MAC CE is used in the NR. A detailed format will be described below.

1 Option 3: In case that both LTE node and NR node support to process a PHR report for multiple TRPs and application and use of the new PHR MAC CE for supporting same is possible. In this case, when a PHR triggering condition occurs (e.g., pathloss of any cells or TRPs in the configured cell groups are changed higher than the configured threshold), the UE may operate by applying a PHR support basic operation for multiple TRPs in the DC.

2. MAC CE Format

Figure 11A:
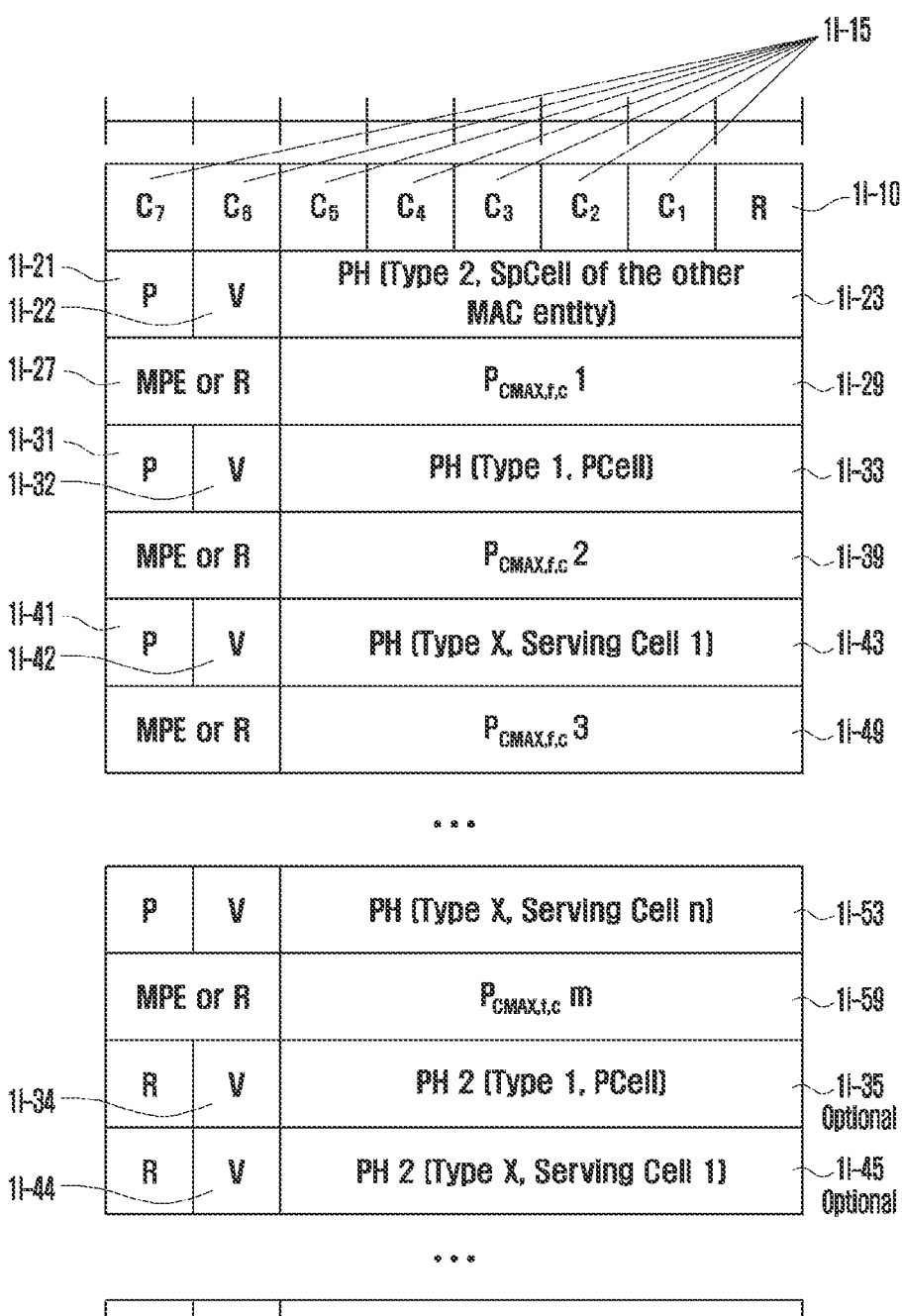
Figure 11C:
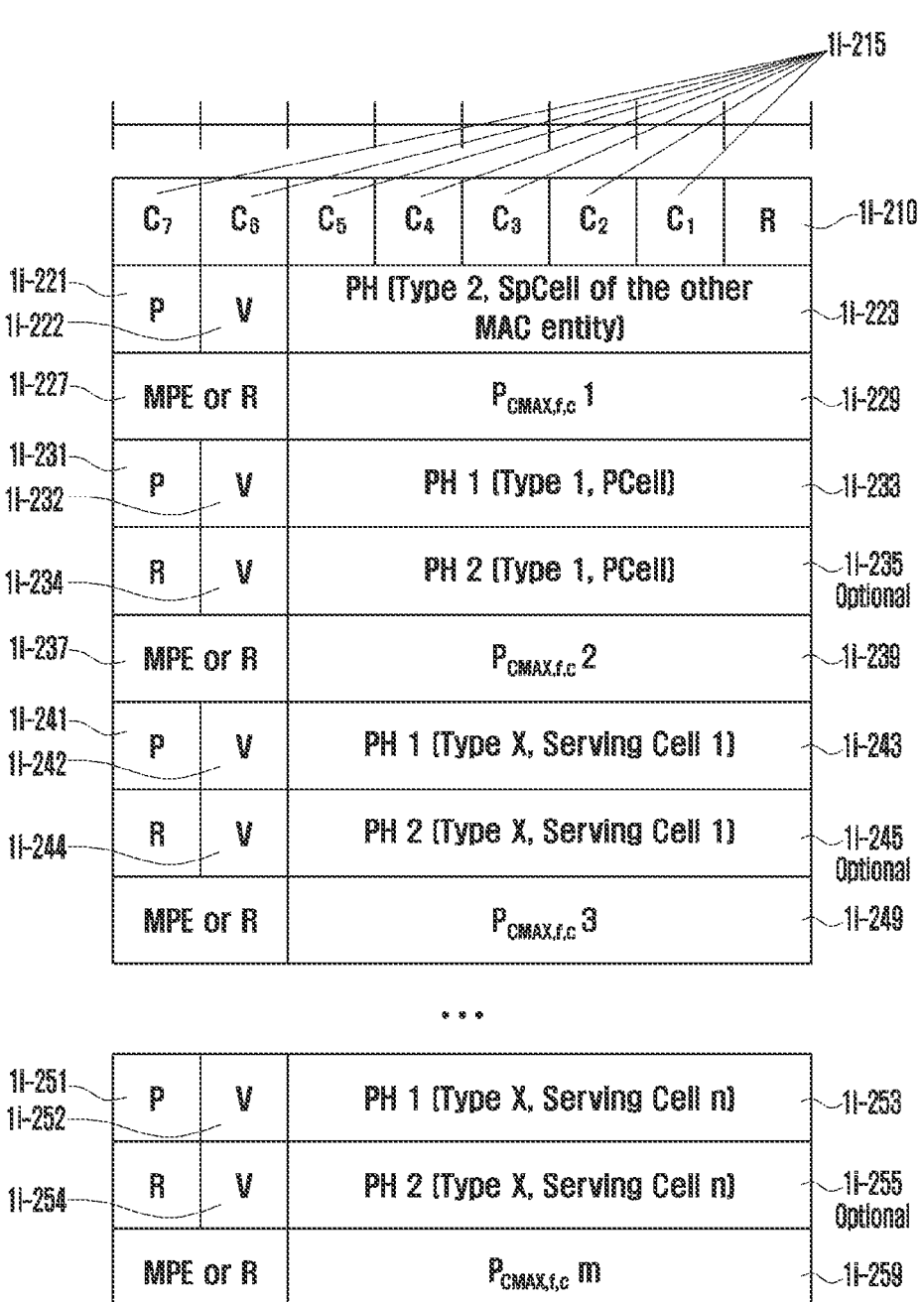

The biggest difference from the PHR MAC CE format of FIGS. 11A to 11C is that the MAC CE format is designed to allow a PHR report for multiple TRPs in cells belonging to another cell group. Added fields in the drawing are octets related to a PH2 report field 1*j*-25, 1*j*-125, or 1*j*-225 with respect to an sPCell. R bit and V bit 1*j*-24, 1*j*-124, and 1*j*-224 are added and V bit is an indicator indicating whether the PH2 value is obtained from actual transmission or a virtual value:

A. Method 1 (1*j*-05): By extending a legacy PHR MAC CE format, change is performed to allow a report required for PH values 1*j*-25, 1*j*-35, 1*j*-45, and 1*j*-55 for a second TRP and a PHR. The corresponding PH values may exist as an option according to the configuration;

B. Method 2 (1*j*-105): A new PHR MAC CE is introduced (new LCID/eLCID allocation) to allow one or two PH values to be reported per serving cell. Here, the case where one PH value is reported corresponds to a legacy method 1*j*-125 for a PHR report per cell and the case where two PH values are reported corresponds to a newly introduced method 1*j*-123, 1*j*-125, 1*j*-133, 1*j*-135, 1*j*-143, 1*j*-145, 1*j*-153, of 1*j*-155 for a PHR report for each TRP. Additionally, in method 2, a cell in which the PH report with respect to multiple TRPs is performed is indicated through explicit bitmap information 1*j*-120; and C. Method 3 (1*j*-205): A new PHR MAC CE is introduced (new LCID/eLCID allocation) to allow one or two PH values to be reported per serving cell. Here, the case where one PH value is reported corresponds to a legacy method 1*j*-225 for a PHR report per cell and the case where two PH values are reported corresponds to a newly introduced method 1*j*-223, 1*j*-225, 1*j*-233, 1*j*-235, 1*j*-243, 1*j*-245, 1*j*-253, of 1*j*-255 for a PHR report for each TRP Method 3 is different from Method 2 in that the former assumes that rather than indicating a serving cell where a PH report for multiple TRPs is performed through explicit signaling, the UE may know in which cell PUSCH repetition is configured through RRC configuration, so the UE may perform a PHR MAC CE report without signaling. That is, the UE performs a cell-level PH report with respect to a serving cell in which PUSCH repetition is not configured (a PH report is not performed for TRP2), based on the received RRC configuration as in conventional methods.

In case that the multiple entry PHR MAC CE format is applied to all the above-described methods, the UE informs a serving cell in which a power headroom report is performed through the bitmaps 1*j*-15, 1*j*-115, and 1*j*-215, and the power headroom report is performed for the serving cell informed of the report and serving cells unconditionally reported by using the above-described methods. In case that a report is required, PCMAX,f,c values 1*j*-29, 1*j*-39, 1*j*-49, 1*j*-59, 1*j*-129, 1*j*-139, 1*j*-149, 1*j*-159, 1*j*-229, 1*j*-239, 1*j*-249, and 1*j*-259 corresponding thereto are reported together. For reference, the Pcmax is the cell-based UE transmission power, which exists as a conventional art and the UE perform an PUSCH repetition operation through multiple TRPs in the TDM method, thus causing no effect to the Pcmax.

P bits 1*j*-21, 1*j*-31, 1*j*-41, 1*j*-121, 1*j*-131, 1*j*-141, 1*j*-151, 1*j*-221, 1*j*-231, 1*j*-241, and 1*j*-251 operate only on a legacy cell basis and do not operate at the TRP level. That is, an indicator for each TRP is not required and only one indicator is required for each serving cell as in conventional methods.

V bits 1*j*-22, 1*j*-24, 1*j*-32, 1*j*-42, 1*j*-34, 1*j*-44, 1*j*-54, 1*j*-122, 1*j*-124, 1*j*-132, 1*j*-142, 1*j*-134, 1*j*-144, 1*j*-154, 1*j*-152, 1*j*-222, 1*j*-224, 1*j*-232, 1*j*-242, 1*j*-234, 1*j*-244, 1*j*-254, and 1*j*-252 are required to indicate whether actual transfer or a virtual transfer is performed depending on whether there is transmission at an actual transmission timing for each TRP.

MPE values 1*j*-27, 1*j*-127, and 1*j*-227 also operate on a legacy cell basis like P bits.

The DC and CA situation is assumed in the present embodiment, and thus a description for a single entry PHR MAC CE will be omitted. Furthermore, with respect to a multiple entry PHR MAC CE, a format for the case where 8 or less cells are configured will be described. It is to be noted at the outset that a MAC CE format for 8 or more and 32 or less cells is described by easily extending a description below.

Figure 1K:
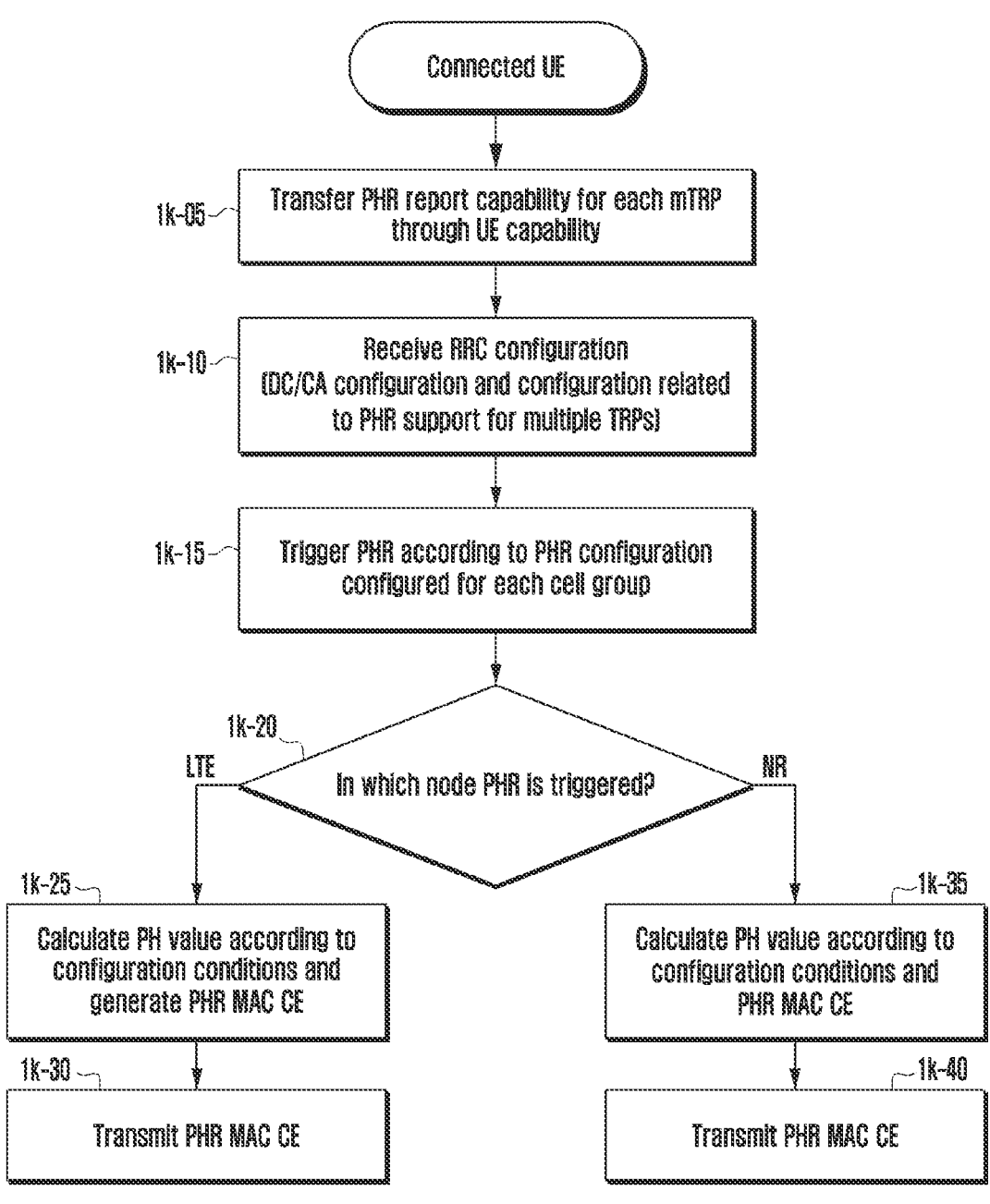
FIG. 1K illustrates an operation of a UE for performing a PHR with respect to multiple TRPs in a DC situation according to an embodiment of the disclosure.

FIG. 1K illustrates an operation of a UE for performing a power headroom report (PHR) with respect to multiple transmission reception points (TRPs) in a dual connectivity (DC) situation according to an embodiment of the disclosure.

More specifically, FIG. 1K is a diagram specifically illustrating a method for performing a PHR with respect to multiple TRPs in a DC situation as an embodiment of UE operation applied to the disclosure.

In operation 1K-15, the UE in a connection state transfers UE capability to the corresponding base station and the terminal capability may include capability to calculate and transfer a PHR with respect to multiple TRPs described the disclosure. The corresponding UE capability may be signaled with an indicator for each UE, or signaled for each band and band combination.

In operation 1K-10, the UE receives RRC configuration from the base station and the RRC configuration includes DC and CA-related configuration and PHR-related configuration together with basic configuration information. Following parameters related to RRC configuration for PHR transmission through multiple TRPs may be included, and the following parameters may be configured for each UE, each cell/BWP, MAC entity (cell group) or the like by using PHR configuration.

1. PHR configuration (PHR-Config) for each MAC entity (cell group):

multiTRP-PHR (twoPHRMode field): Indicator for activating PHR report with respect to TRPs to the UE;

phr-PeriodicTimer: PHR Periodical timer which is commonly applied to a PHR report with respect to TRP1 and TRP2;

phr-Tx-PowerFactorChange: A power change reference threshold value which is commonly applied to a PHR report with respect to TRP1 and TRP2; and mpe-related application and mpe-related parameter (e.g., mpe-Reporting-FR2).

2. Configuration for each serving cell/BWP (PUSCH-Config):

PUSCH repetition-related configuration: Configuration related to PUSCH repetition through multiple TRPs.

Specifically, as may be identified in the configuration, although the configuration for indicating the PHR report with respect to the multiple TRPs is indicated for each MAC entity (cell group), the actual configuration of the PUSCH repetition through the multiple TRPs is configured for each serving cell. That is, in case that the PHR report is configured with respect to the multiple TRPs without the configuration of the PUSCH repetition through the multiple TRPs in a specific serving cell, the PHR report through the multiple TRPs may not be performed in the corresponding serving cell.

In operation 1K-15, the UE performs monitoring for PHR triggering and a PHR triggering operation according to RRC configuration for each cell group, specifically, PHR configuration. In case that DC is configured, the PHR configuration is independently configured and operated for each cell group and thus the UE triggers the PHR according to a PHR configuration condition configured in each cell group. See 1*h*-40 and 1*h*-55 in FIG. 1H for detailed conditions and methods.

In operation 1*k*-20, the UE may operates differently depending on in which node the triggered PHR is triggered according to PHR configuration conditions configured. If a PHR is triggered in the LTE node in an EN-DC or NE-DC situation, in operation 1*k*-25, the UE may perform one of following operations with respect to PH value calculation and PHR MAC CE generation. See FIG. 1JA to 1JC for a MAC CE format.

1 Option 1: A case that when processing of a PHR report for multiple TRPs is not supported by the LTE node, even if processing of a PHR report for multiple TRPs is supported or configured by the NR node, the restriction that a PHR report for multiple TRPs is not supported even in EN-DC/ NE-DC is specified. In this case, a legacy PHR MAC CE is applied to the LTE, and only cell-based PHR report is reported.

L Option 2: The new PHR MAC CE format is designed to include a PH value in the LTE and a PH value in the NR, a cell-based PH report (using one TRP) is performed in the LTE as in the conventional method, and a PHR report is performed through multiple TRPs in the NR:

The LTE and the NR MAC entity use PHR MAC CE formats respectively defined therein (depending on cell groups in which PHR is triggered or not);

Triggering in the LTE MAC entity: In case that the PHR is triggered according to the PHR configuration of the LTE, the UE transfers the cell-based PH value report for both NTE and NR cells through the legacy PHR MAC CE defined in the LTE. A condition (e.g., pathloss of any cells or TRPs in the configured cell groups are changed higher than the configured threshold) related to pathloss of any TRP changes may be specified in the LTE; and Triggering in the NR MAC entity: In case that the PHR is triggered according to the PHR configuration of the NR, the UE transfers the cell-based PH value report for both NTE and NR cells through the legacy PHR MAC CE defined in the LTE. That is, the legacy cell-based PH value report is performed in cells among LTE cells and NR cells, in which a PHR report for multiple TRPs is not configured and the TRP-based PH value report is performed in cells of NR cells, in which a PHR report for multiple TRPs is configured. In this case the newly introduced PHR MAC CE is used in the NR. A detailed format will be described below.

1 Option 3: In case that both LTE node and NR node support to process a PHR report for multiple TRPs and application and use of the new PHR MAC CE for supporting same is possible. In this case, when a PHR triggering condition occurs (e.g., pathloss of any cells or TRPs in the configured cell groups are changed higher than the configured threshold), the UE may operate by applying a PHR support basic operation for multiple TRPs in the DC.

Thereafter, in operation 1*k*-30, the UE inserts the generated MAC CE into uplink grant received from the base station to be transferred to the base station.

In operation 1*k*-20. If a PHR is triggered in the NR node in an EN-DC, NE-DC, or NR-DC situation, in operation 1k-35, the UE may perform one of following operations with respect to PH value calculation and PHR MAC CE generation. See FIGS. 1JA to 1JC for a MAC CE format.

A. NR-DR operation: A configuration (twoPHRMode) indicating a PHR report for multiple TRPs may be provided to both cell groups. In this case, when the PHR is triggered according to the configuration, the UE calculates two PH values in both cell groups with respect to serving cells in which PUSCH repetition through multiple TRPs is configured, and adds the calculation result to the newly introduced PHR MAC CE format. In addition, the UE calculates a PHR for transmission (the legacy cell-based transmission) through one TRP with respect to serving cells in which PUSCH repetition through multiple TRPs is not configured and adds the calculation result to the newly introduced PHR MAC CE format. Hereinafter, the operation is named and referred to as a PHR support basic operation for multiple TRPs in DC.

B. EN-DC, NE-DC option 1: A case that when processing of a PHR report for multiple TRPs is not supported by the LTE node, even if processing of a PHR report for multiple TRPs is supported or configured by the NR node, the restriction that a PHR report for multiple TRPs is not supported even in EN-DC/NE-DC is specified. In this case, a legacy PHR MAC CE is applied to the LTE, and only cell-based PHR report is reported.

C. EN-DC, NE-DC option 2: The new PHR MAC CE format is designed to include a PH value in the LTE and a PH value in the NR, a cell-based PH report (using one TRP) is performed in the LTE as in the conventional method, and a PHR report is performed through multiple TRPs in the NR:

The LTE and the NR MAC entity use PHR MAC CE formats respectively defined therein (depending on cell groups in which PHR is triggered or not);

Triggering in the LTE MAC entity: In case that the PHR is triggered according to the PHR configuration of the LTE, the UE transfers the cell-based PH value report for both NTE and NR cells through the legacy PHR MAC CE defined in the LTE. A condition (e.g., pathloss of any cells or TRPs in the configured cell groups are changed higher than the configured threshold) related to pathloss of any TRP changes may be specified in the LTE; and Triggering in the NR MAC entity: In case that the PHR is triggered according to the PHR configuration of the NR, the UE transfers the cell-based PH value report for both NTE and NR cells through the legacy PHR MAC CE defined in the LTE. That is, the legacy cell-based PH value report is performed in cells among LTE cells and NR cells, in which a PHR report for multiple TRPs is not configured and the TRP-based PH value report is performed in cells of NR cells, in which a PHR report for multiple TRPs is configured. In this case the newly introduced PHR MAC CE is used in the NR. A detailed format will be described below.

D. EN-DC, NE-DC option 3: In case that both LTE node and NR node support to process a PHR report for multiple TRPs and application and use of the new PHR MAC CE for supporting same is possible. In this case, when a PHR triggering condition occurs (e.g., pathloss of any cells or TRPs in the configured cell groups are changed higher than the configured threshold), the UE may operate by applying a PHR support basic operation for multiple TRPs in the DC.

Thereafter, in operation 1k-40, the UE inserts the generated MAC CE into uplink grant received from the base station to be transferred to the base station.

Figure 1L:
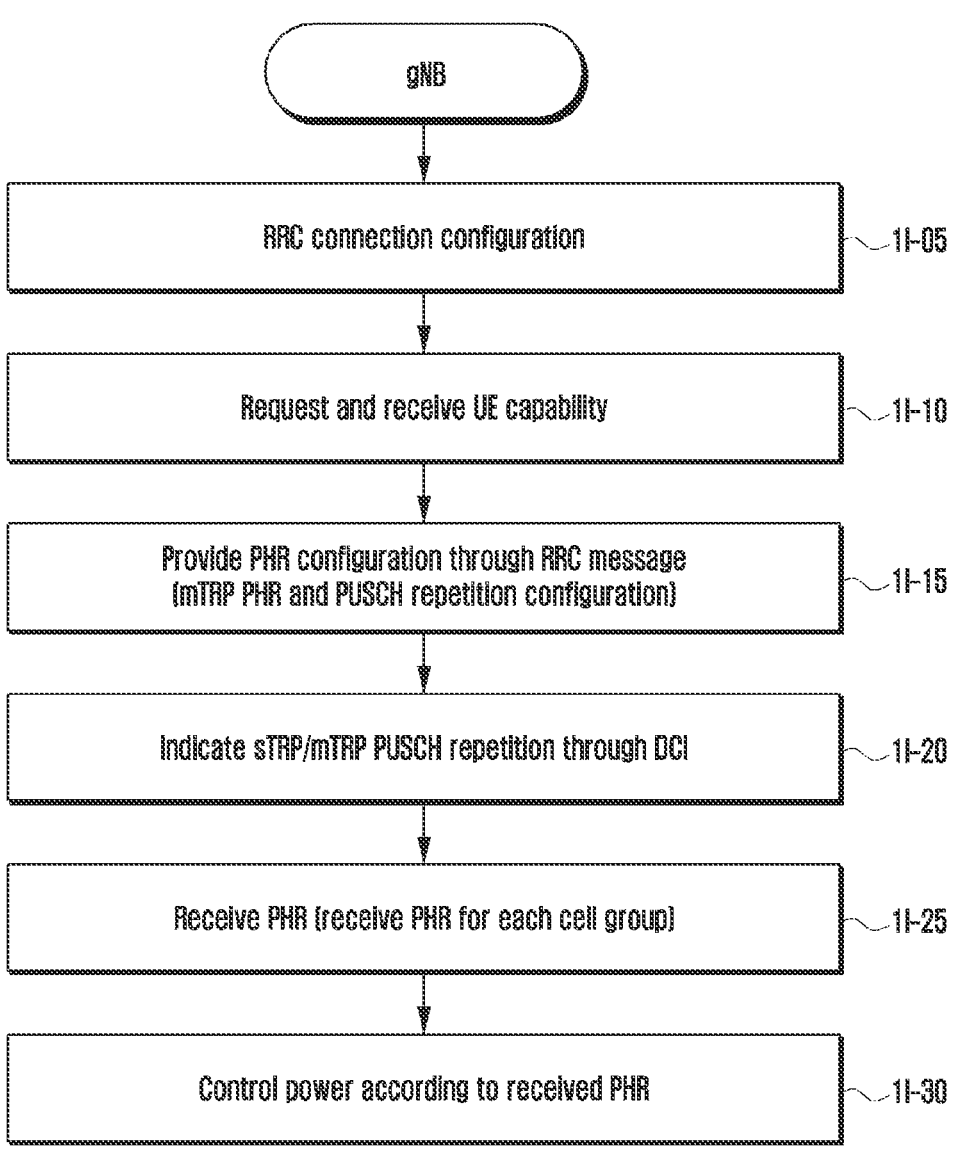
FIG. 1L illustrates an operation of a base station according to an embodiment of the disclosure.

FIG. 1L illustrate an operation of a base station according to an embodiment of the disclosure;

In operation 1l-05, the base station establishes connection with the UE and in operation 1l-10, requests and receives capability of the UE. In the operation, whether PHR MAC CE report capability for multiple TRP (or PUSCH retransmission capability using multiple TRPs) exists may be determined according to the capability of the UE and thereafter, in operation 1l-15, RRC configuration information considering the capability of the UE may be provided. In the operation, the base station may provide configuration related to DC and CA and configuration related to the PHR and PUSCH retransmission using multiple TRPs. See FIG. 1H for a detailed description of configuration. In operation 1l-20, the base station may indicate PUSCH repetition through sTRP and mTRP via DCI in addition to the RRC configuration. In this case, there is no effect on the PHR operation for multiple TRPs through the new PHR MAC CE suggested by the disclosure and only a method for configuring V field values for TRP2 is affected. That is, when indicated with sTRP, the V field is set to virtual.

In operation 1l-25, the base station may receive the PHR MAC CE from the UE and the PHR MAC CE is affected by a cell group in which the PHR MAC CE is configured according to the above-described scenarios and methods. In operation 1l-30, the base station performs power control for the UE with reference to the actually received PHR report.

Figure 1M:
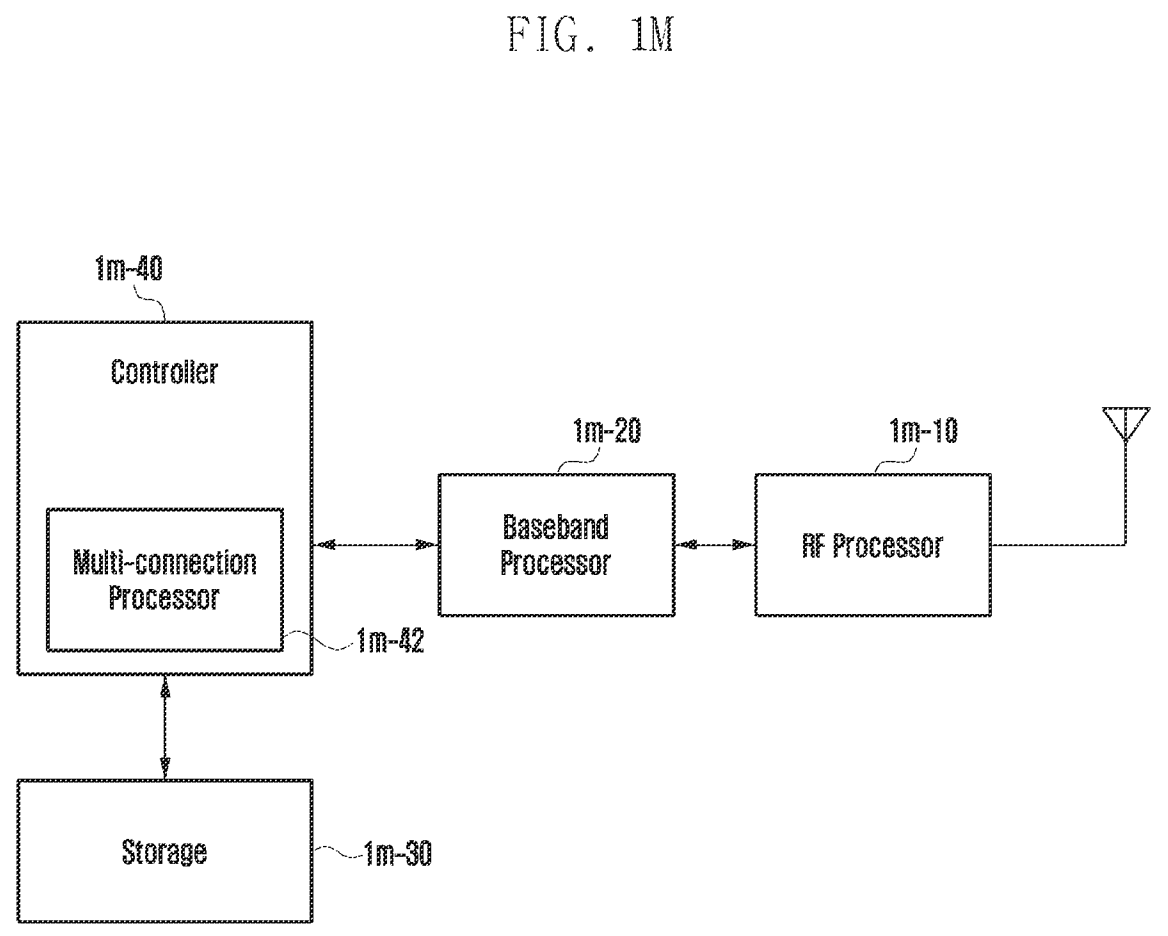

FIG. 1M illustrates an internal structure of a UE to which an embodiment of the disclosure is applied.

Referring to FIG. 1M, the UE includes a radio frequency (RF) processor 1m-10, a baseband processor 1m-20, a storage unit 1m-30, and a controller 1m-40.

The RF processor 1m-10 performs a function for transmitting or receiving a signal through a radio channel, such as signal band conversion, amplification, and the like. That is, the RF processor 1m-10 up-converts a baseband signal, provided from the baseband processor 1m-20, into an RF-band signal, transmits the RF-band signal through an antenna, and down-converts an RF-band signal received through an antenna into a baseband signal. For example, the RF processor 1m-10 may include a transmit filter, a receive filter, an amplifier, a mixer, an oscillator, a digital to analog converter (DAC), an analog to digital converter (ADC), and the like. In the drawing, only one antenna is shown, but the UE may include multiple antennas. In addition, the RF processor 1m-10 may include multiple RF chains. Furthermore, the RF processor 1m-10 may perform beamforming. For the beamforming, the RF processor 1m-10 may adjust a phase and magnitude of each of signals transmitted and received through multiple antennas or antenna elements. The RF processor may perform MIMO, and may receive multiple layers when performing MIMO operation.

The baseband processor 1m-20 performs a function of conversion between a baseband signal and a bitstream according to the physical layer specifications of a system. For example, in case of transmitting data, the baseband processor 1m-20 generates complex symbols by encoding and modulating a transmission bit stream. In addition, in case of receiving data, the baseband processor 1m-20 reconstructs a received bitstream by demodulating and decoding a baseband signal provided from the RF processor 1m-10. For example, in case of following an orthogonal frequency-division multiplexing (OFDM) scheme, during data transmission, the baseband processor 1m-20 generates complex symbols by encoding and modulating a transmission bit-stream, maps the complex symbols to subcarriers, and then configures OFDM symbols by performing inverse fast Fourier transformation (IFFT) operation and cyclic prefix (CP) insertion. In addition, in case of receiving data, the baseband processor 1m-20 divides the baseband signal provided from the RF processor 1m-10 into OFDM symbol units, restores signals mapped to subcarriers through a fast Fourier transform (FFT) operation, and then restores a received bitstream through demodulation and decoding.

The baseband processor 1m-20 and the RF processor 1m-10 transmit and receive signals as described above. Accordingly, the baseband processor 1m-20 and the RF processor 1m-10 may be referred to as a transmitter, a receiver, a transceiver, or a communication unit. Furthermore, at least one of the baseband processor 1m-20 and the RF processor 1m-10 may include multiple communication modules to support multiple different radio access technologies. In addition, at least one of the baseband processor 1m-20 and the RF processor 1m-10 may include different communication modules to process signals of different frequency bands. For example, the different radio access technologies may include wireless LAN (e.g., IEEE 802.11) and a cellular network (e.g., LTE), and the like. The different frequency bands may include a super high frequency (SHF) (e.g., 2.NRHz) band and a millimeter wave (e.g., 60 GHz) band.

The storage unit 1m-30 stores data, such as a default program, an application program, and configuration information for the operation of the UE. Specifically, the storage unit 1m-30 may store information related to a second connection node for performing wireless communication by using a second wireless connection technology. In addition, the storage unit 1m-30 provides the stored data in response to a request from the controller 1m-40.

The controller 1m-40 controls the overall operation of the UE. For example, the controller 1m-40 transmits or receives signals through the baseband processor 1m-20 and the RF processor 1m-10. Further, the controller 1m-40 records and reads data on or from the storage unit 1m-30. To this end, the controller 1m-40 may include at least one processor. For example, the controller 1m-40 may include a communication processor (CP) for controlling communication and an application processor (AP) for controlling an upper layer, such as an application.

Figure 1N:
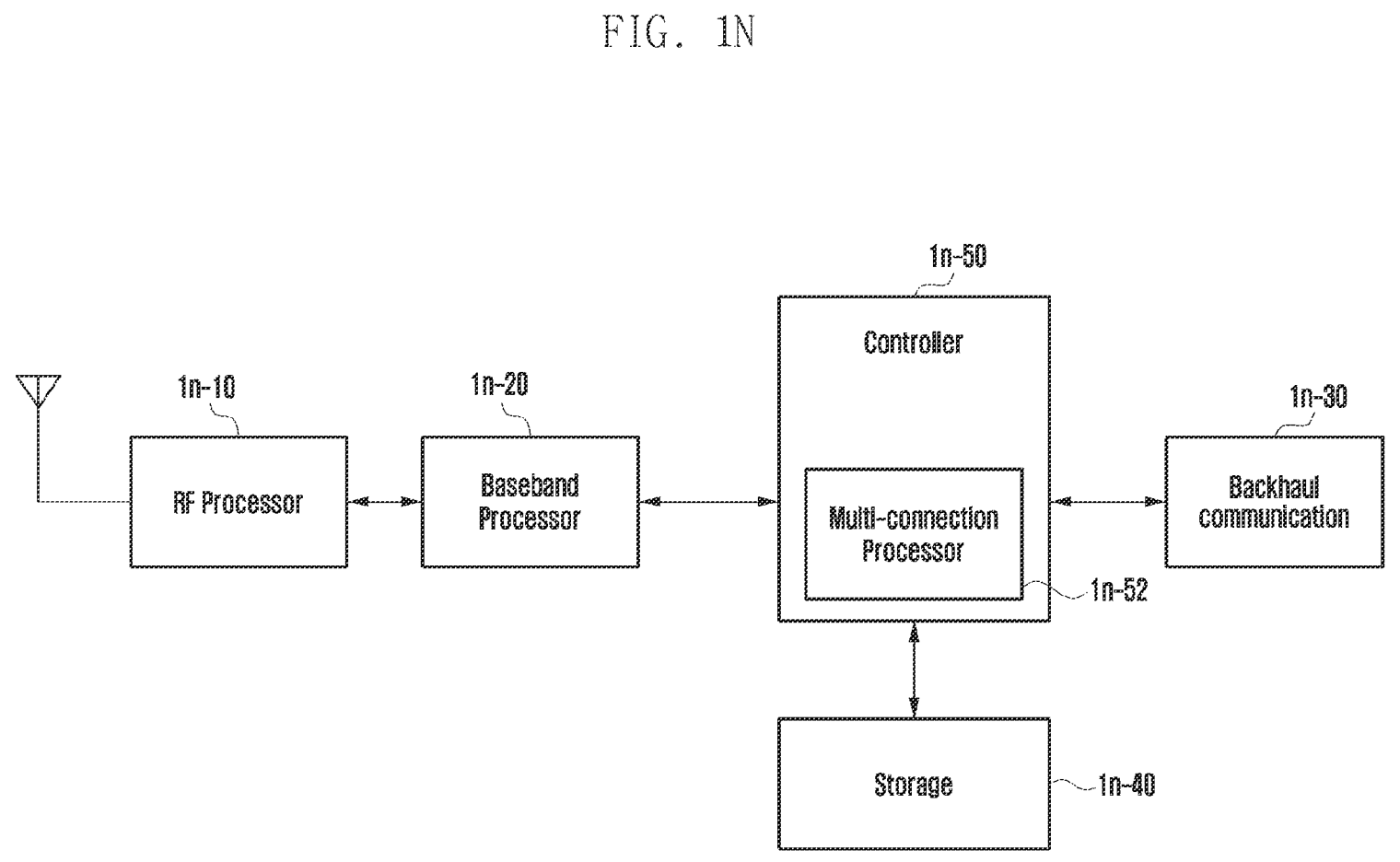

FIG. 1N illustrates a structure of a new radio (NR) base station according to an embodiment of the disclosure.

As illustrated in the drawing, the base station may include an RF processor in-10, a baseband processor 1n-20, a backhaul communication unit 1n-30, a storage unit 1n-40, and a controller in-50.

The RF processor in-10 may perform a function for transmitting or receiving a signal through a radio channel, such as signal band conversion, amplification, and the like. That is, the RF processor 1n-10 up-converts a baseband signal, provided from the baseband processor in-20, into an RF-band signal, transmits the RF-band signal through an antenna, and down-converts an RF-band signal received through an antenna into a baseband signal. For example, the RF processor 1n-10 may include a transmit filter, a receive filter, an amplifier, a DAC, an ADC, and the like. In the drawing, only one antenna is shown, but the first connection node may include multiple antennas. In addition, the RF processor in-10 may include multiple RF chains. Furthermore, the RF processor in-10 may perform beamforming. For the beamforming, the RF processor 1n-10 may adjust a phase and magnitude of each of signals transmitted and received through multiple antennas or antenna elements. The RF processor may perform a downlink MIMO operation by transmitting one or more layers.

The baseband processor 1n-20 performs a function of conversion between a baseband signal and a bitstream according to the physical layer standards of a first radio access technology. For example, in case of transmitting data, the baseband processor 1n-20 generates complex symbols by encoding and modulating a transmission bit stream. In addition, in case of receiving data, the baseband processor 1n-20 reconstructs a received bitstream by demodulating and decoding a baseband signal provided from the RF processor 1n-10. For example, in case of following an OFDM scheme, during data transmission, the baseband processor 1n-20 generates complex symbols by encoding and modulating a transmission bitstream, maps the complex symbols to subcarriers, and then configures OFDM symbols by performing IFFT operation and CP insertion. In addition, in case of receiving data, the baseband processor 1n-20 divides the baseband signal provided from the RF processor in-10 into OFDM symbol units, restores signals mapped to subcarriers through a FFT operation, and then restores a received bitstream through demodulation and decoding. The baseband processor 1n-20 and the RF processor in-10 transmit and receive signals as described above. Accordingly, the baseband processor 1n-20 and the RF processor 1n-10 may be referred to as a transmitter, a receiver, a transceiver, a communication unit, or a wireless communication unit.

The backhaul communication unit 1n-30 provides an interface for performing communication with other nodes in the network. That is, the backhaul communication unit 1n-30 converts a bitstream transmitted from a main base station to another node, for example, an auxiliary base station, the core network, and the like, into a physical signal, and converts a physical signal received from another node into a bitstream.

The storage unit 1n-40 stores data, such as a default program, an application program, and configuration information for the operation of the main base station. The storage in-40 may store information related to a bearer allocated to a connected UE, the result of measurement reported from the connected UE, and the like. In addition, the storage unit 1n-40 may store information which serves as criteria for determining whether to provide or stop multi-connectivity to the UE. In addition, the storage unit 1n-40 provides the stored data in response to a request from the controller 1n-50.

The controller 1n-50 controls the overall operation of the main base station. For example, the controller 1n-50 transmits or receives signals through the baseband processor 1n-20 and the RF processor 1n-10 or through the backhaul communication unit 1n-30. Further, the controller 1n-50 records and reads data on or from the storage unit 1n-40. To this end, the controller 1n-50 may include at least one processor.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the purpose of illustration, and embodiments of the disclosure are not limited to the embodiments set forth herein. Those skilled in the art will appreciate that other particular modifications and changes may be easily made without departing from the technical idea or the essential features of the disclosure. The scope of the disclosure should be determined not by the above description but by the appended claims, and all modifications or changes derived from the meaning and scope of the claims and equivalent concepts thereof shall be construed as falling within the scope of the disclosure.

What is claimed is:

1. A method performed by a user equipment (UE) in a wireless communication system, the method comprising:
receiving, from a first base station, a radio resource control (RRC) message including configuration information for a first medium access control (MAC) entity associated with a first cell group and configuration information for a second MAC entity associated with a second cell group; and
in case that the first MAC entity is configured with two power headroom report (PHR) mode information, a first serving cell is configured with multiple transmit and receive point (TRP) physical uplink shared channel (PUSCH) repetition, and a MAC entity the first serving cell belongs to is configured with the two PHR mode information, obtaining two power headrooms for the first serving cell,
wherein the two power headrooms for the first serving cell are transmitted, to the first base station, via a PHR MAC control element (CE), and
wherein the two PHR mode information indicates to report a power headroom as two PHRs, each PHR being associated with a sounding reference signal (SRS) resource set.

2. The method of claim 1, further comprising:
in case that a second serving cell is not configured with the multiple TRP PUSCH repetition, obtaining one power headroom for the second serving cell,
wherein the one power headroom for the second serving cell is transmitted, to the first base station, via the PHR MAC CE.

3. The method of claim 2,
wherein the PHR MAC CE includes one power headroom (PH) field for the second serving cell.

4. The method of claim 1, further comprising:
in case that the first MAC entity is not configured with the two PHR mode information, obtaining one power headroom for the first serving cell,
wherein the one power headroom for the first serving cell is transmitted, to the first base station, via the PHR MAC CE.

5. The method of claim 4,
wherein the PHR MAC CE includes one power headroom (PH) field for the first serving cell.

6. The method of claim 1,
wherein the PHR MAC CE includes two power headroom (PH) fields for the first serving cell, and
wherein each PH field among the two PH fields is associated with a corresponding SRS resource set.

7. The method of claim 1,
wherein the PHR MAC CE includes at least one of a P field, a V field, or a maximum permissible exposure (MPE) field,
wherein the P field indicates whether a power backoff is applied due to a power management,
wherein the V field indicates whether a power headroom (PH) value is based on a real transmission or a reference format, and
wherein the MPE field indicates that the applied power backoff satisfies an MPE requirement.

8. A user equipment (UE) in a wireless communication system, the UE comprising:

a transceiver, and a controller coupled with the transceiver, and configured to:

receive, from a first base station, a radio resource control (RRC) message including configuration information for a first medium access control (MAC) entity associated with a first cell group and configuration information for a second MAC entity associated with a second cell group, and in case that the first MAC entity is configured with two power headroom report (PHR) mode information, a first serving cell is configured with multiple transmit and receive point (TRP) physical uplink shared channel (PUSCH) repetition, and a MAC entity the first serving cell belongs to is configured with the two PHR mode information, obtain two power headrooms for the first serving cell, wherein the two power headrooms for the first serving cell are transmitted, to the first base station, via a PHR MAC control element (CE), and wherein the two PHR mode information indicates to report a power headroom as two PHRs, each PHR being associated with a sounding reference signal (SRS) resource set.

9. The UE of claim 8, wherein the controller is further configured to:

in case that a second serving cell is not configured with the multiple TRP PUSCH repetition, obtain one power headroom for the second serving cell, wherein the one power headroom for the second serving cell is transmitted, to the first base station, via the PHR MAC CE.

10. The UE of claim 9, wherein the PHR MAC CE includes one power headroom (PH) field for the second serving cell.

11. The UE of claim 8, wherein the controller is further configured to:

in case that the first MAC entity is not configured with the two PHR mode information, obtain one power headroom for the first serving cell, wherein the one power headroom for the first serving cell is transmitted, to the first base station, via the PHR MAC CE.

12. The UE of claim 11, wherein the PHR MAC CE includes one power headroom (PH) field for the first serving cell.

13. The UE of claim 8, wherein the PHR MAC CE includes two power headroom (PH) fields for the first serving cell, and wherein each PH field among the two PH fields is associated with a corresponding SRS resource set.

14. The UE of claim 8, wherein the PHR MAC CE includes at least one of a P field, a V field, or a maximum permissible exposure (MPE) field, wherein the P field indicates whether a power backoff is applied due to a power management, wherein the V field indicates whether a power headroom (PH) value is based on a real transmission or a reference format, and wherein the MPE field indicates that the applied power backoff satisfies an MPE requirement.

15. A base station in a wireless communication system, the base station comprising:

a transceiver, and a controller coupled with the transceiver, and configured to:

transmit to a user equipment (UE), a radio resource control (RRC) message including configuration information for a first medium access control (MAC) entity associated with a first cell group and configuration information for a second MAC entity associated with a second cell group, and in case that the first MAC entity is configured with two PHR mode information, a first serving cell is configured with multiple transmit and receive point (TRP) physical uplink shared channel (PUSCH) repetition, and a MAC entity the first serving cell belongs to is configured with the two PHR mode information, receive, from the UE, two power headrooms for the first serving cell, wherein the two power headrooms for the first serving cell are received, from the UE, via a PHR MAC control element (CE), and wherein the two PHR mode information indicates to report a power headroom as two PHRs, each PHR being associated with a sounding reference signal (SRS) resource set.

16. The base station of claim 15, wherein the controller is further configured to:

in case that a second serving cell is not configured with the multiple TRP PUSCH repetition, receive, from the UE, one power headroom for the second serving cell, wherein the one power headroom for the second serving cell is received, from the UE, via the PHR MAC CE.

17. The base station of claim 16, wherein the PHR MAC CE includes one power headroom (PH) field for the second serving cell.

18. The base station of claim 15, wherein the controller is further configured to:

in case that the first MAC entity is not configured with the two PHR mode information, receive, from the UE, one power headroom for the first serving cell, wherein the one power headroom for the first serving cell is received, from the UE, via the PHR MAC CE.

19. The base station of claim 18, wherein the PHR MAC CE includes one power headroom (PH) field for the first serving cell.

20. The base station of claim 15, wherein the PHR MAC CE includes two power headroom (PH) fields for the first serving cell, and wherein each PH field among the two PH fields is associated with a corresponding SRS resource set.

* * * * *